(12) United States Patent
Arroyo et al.

(10) Patent No.: US 8,140,812 B2
(45) Date of Patent: Mar. 20, 2012

(54) METHOD AND APPARATUS FOR TWO-PHASE STORAGE-AWARE PLACEMENT OF VIRTUAL MACHINES

(75) Inventors: Diana J. Arroyo, Austin, TX (US); Steven D. Clay, Pflugerville, TX (US); Malgorzata Steinder, Fort Lee, NJ (US); Ian N. Whalley, Pawling, NY (US); Brian L. White Eagle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 12/496,425

(22) Filed: Jul. 1, 2009

(65) Prior Publication Data

US 2011/0004735 A1 Jan. 6, 2011

(51) Int. Cl.
*G06F 12/00* (2006.01)
*G06F 15/173* (2006.01)

(52) U.S. Cl. ........... 711/170; 711/6; 711/165; 709/216; 709/226

(58) Field of Classification Search ............... 711/6, 165, 711/170; 709/216, 226
See application file for complete search history.

(56) References Cited

U.S. PATENT DOCUMENTS

| 5,239,647 | A | 8/1993 | Anglin et al. | 395/600 |
|---|---|---|---|---|
| 7,900,005 | B2 * | 3/2011 | Kotsovinos et al. | 711/162 |
| 2007/0168478 | A1 * | 7/2007 | Crosbie | 709/221 |
| 2007/0233698 | A1 | 10/2007 | Sundar et al. | 707/10 |
| 2008/0115144 | A1 | 5/2008 | Tsao | 718/105 |
| 2008/0181232 | A1 | 7/2008 | Banzahf et al. | 370/395.3 |
| 2008/0222375 | A1 * | 9/2008 | Kotsovinos et al. | 711/162 |
| 2009/0037680 | A1 * | 2/2009 | Colbert et al. | 711/162 |
| 2009/0210527 | A1 * | 8/2009 | Kawato | 709/224 |
| 2009/0228589 | A1 * | 9/2009 | Korupolu | 709/226 |
| 2010/0057913 | A1 * | 3/2010 | Dehaan | 709/226 |
| 2010/0070978 | A1 * | 3/2010 | Chawla et al. | 718/105 |
| 2010/0161805 | A1 * | 6/2010 | Yoshizawa et al. | 709/226 |
| 2010/0250744 | A1 * | 9/2010 | Hadad et al. | 709/226 |
| 2010/0306382 | A1 * | 12/2010 | Cardosa et al. | 709/226 |
| 2010/0332657 | A1 * | 12/2010 | Elyashev et al. | 709/226 |
| 2011/0055388 | A1 * | 3/2011 | Yumerefendi et al. | 709/224 |
| 2011/0131571 | A1 * | 6/2011 | Heim | 718/1 |
| 2011/0213911 | A1 * | 9/2011 | Eidus et al. | 711/6 |
| 2011/0214005 | A1 * | 9/2011 | Biran et al. | 714/1 |

OTHER PUBLICATIONS

U.S. Appl. No. 61/096,698, filed Sep. 12, 2008.*
Barham, P. et al., Xen and the Art of Virtualization, pp. 164-177 (2003).
Grit, L. et al., Virtual Machine Hosting for Networked Clusters: Building the Foundations for "Autonomic" Orchestration, pp. 1-8 (2006).

* cited by examiner

*Primary Examiner* — John Lane
(74) *Attorney, Agent, or Firm* — Ido Tuchman; Preston J. Young

(57) ABSTRACT

Techniques for placement of a virtual machine in a computing system. A first request is sent from a pool management subsystem to a placement subsystem. The first request includes specification of available storage capacities of storage systems in a computer network. The placement subsystem automatically determines a target storage system based, at least in part, on the available storage capacities. An identification of the target storage system is received at the pool management subsystem. At least one disk image of the virtual machine is written to the target storage system. Then, a second request is sent to the placement subsystem. The placement subsystem automatically determines a target computer. The latter determination is based, at least in part, on connectivity between the target computer and the target storage system. The virtual machine is installed at the target computer. The techniques facilitate live migration of virtual machines placed thereby.

18 Claims, 8 Drawing Sheets

METHOD AND APPARATUS FOR TWO-PHASE STORAGE-AWARE PLACEMENT OF VIRTUAL MACHINES

BACKGROUND OF THE INVENTION

1. Field of the Invention

The present invention relates generally to virtualization. More specifically, the present invention relates to techniques for efficient placement decisions in virtualization environments having heterogeneous storage and network connectivity.

2. Description of Background

Virtualization is, broadly speaking, the ability to make computing resources abstract. Diverse computing resources can be made abstract through virtualization. Notably, platform virtualization is the virtualization of computer systems (as opposed to, for example, storage or computer networks).

Common types of platform virtualization include full virtualization and operating system-level virtualization. Full virtualization is the execution of multiple operating system instances (OSI's) on a single computer. The OSI's are usually isolated from each other despite their coexistence within the same computer. By contrast, operating system-level virtualization is the presentation of multiple spaces within a single operating system. Programs execute within the spaces thus presented. The spaces are isolated from each other despite their coexistence within the same operating system.

Virtualization technologies have existed for a significant period of time. For example, the IBM® VM product line, which implements virtualization, was originally announced in 1972. IBM is a registered trademark of International Business Machines Corporation, Armonk, N.Y., United States, in the United States, other countries, or both.

However, virtualization technologies have recently been experiencing increased usage as well as changing usage patterns. Virtualization originated on hardware which was among the most powerful available at that time. By contrast, at the time of this writing, virtualization is becoming increasingly prevalent on less powerful hardware as well. Several factors are contributing to this trend. One such factor is that, at the time of this writing, virtualization technology is either free or cost-effective. As a result, virtualization is within the reach of potentially every customer and organization. Moreover, modern virtualization systems are increasingly flexible and easy to use. This ensures that the small army of highly-trained support personnel which was formerly required to maintain virtualization systems is no longer necessary. Thus, the increasing prevalence of virtualization on less powerful hardware is having a marked effect on the Information Technology (IT) industry.

SUMMARY OF THE INVENTION

One aspect of the invention is a method for placement of a virtual machine in a computing system. The method comprises sending, from a pool management subsystem, a first request to a placement subsystem. The first request includes specification of available storage capacities of a plurality of storage systems in a computer network. The method further comprises automatically determining, by the placement subsystem, a target storage system of the plurality of storage systems to place at least one disk image of the virtual machine based, at least in part, on the available storage capacities of the plurality of storage systems in the computer network. The method further comprises receiving, at the pool management subsystem, an identification of the target storage system from the placement subsystem. The method further comprises writing the at least one disk image of the virtual machine to the target storage system.

Another aspect of the invention is a system for placement of a virtual machine in a computing system. The system comprises a placement subsystem. The placement subsystem is configured to automatically determine a target storage system of a plurality of storage systems in a computer network to place at least one disk image of the virtual machine based, at least in part, on available storage capacities of the plurality of storage systems in the computer network. The system further comprises a pool management subsystem. The pool management subsystem is configured to send a first request to the placement subsystem. The first request includes specification of the available storage capacities of the plurality of storage systems. The pool management subsystem is further configured to receive an identification of the target storage system from the placement subsystem. The pool management subsystem is further configured to write the at least one disk image of the virtual machine to the target storage system.

Another aspect of the invention is a computer program product embodied in a computer readable storage medium. For example, the computer program product may include one or more tools for placement of a virtual machine in a computing system. Computer readable program codes are coupled to the computer readable storage medium and are configured to cause the program to send, from a pool management subsystem, a first request to a placement subsystem. The first request includes specification of available storage capacities of a plurality of storage systems in a computer network. The computer readable program codes are further configured to cause the program to automatically determine, by the placement subsystem, a target storage system of the plurality of storage systems to place at least one disk image of the virtual machine based, at least in part, on the available storage capacities of the plurality of storage systems in the computer network. The computer readable program codes are further configured to cause the program to receive, at the pool management subsystem, an identification of the target storage system from the placement subsystem. The computer readable program codes are further configured to cause the program to write the at least one disk image of the virtual machine to the target storage system.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

The present invention is described with reference to embodiments of the invention. Throughout the description of the invention reference is made to FIGS. 1-6.

Figure 1:
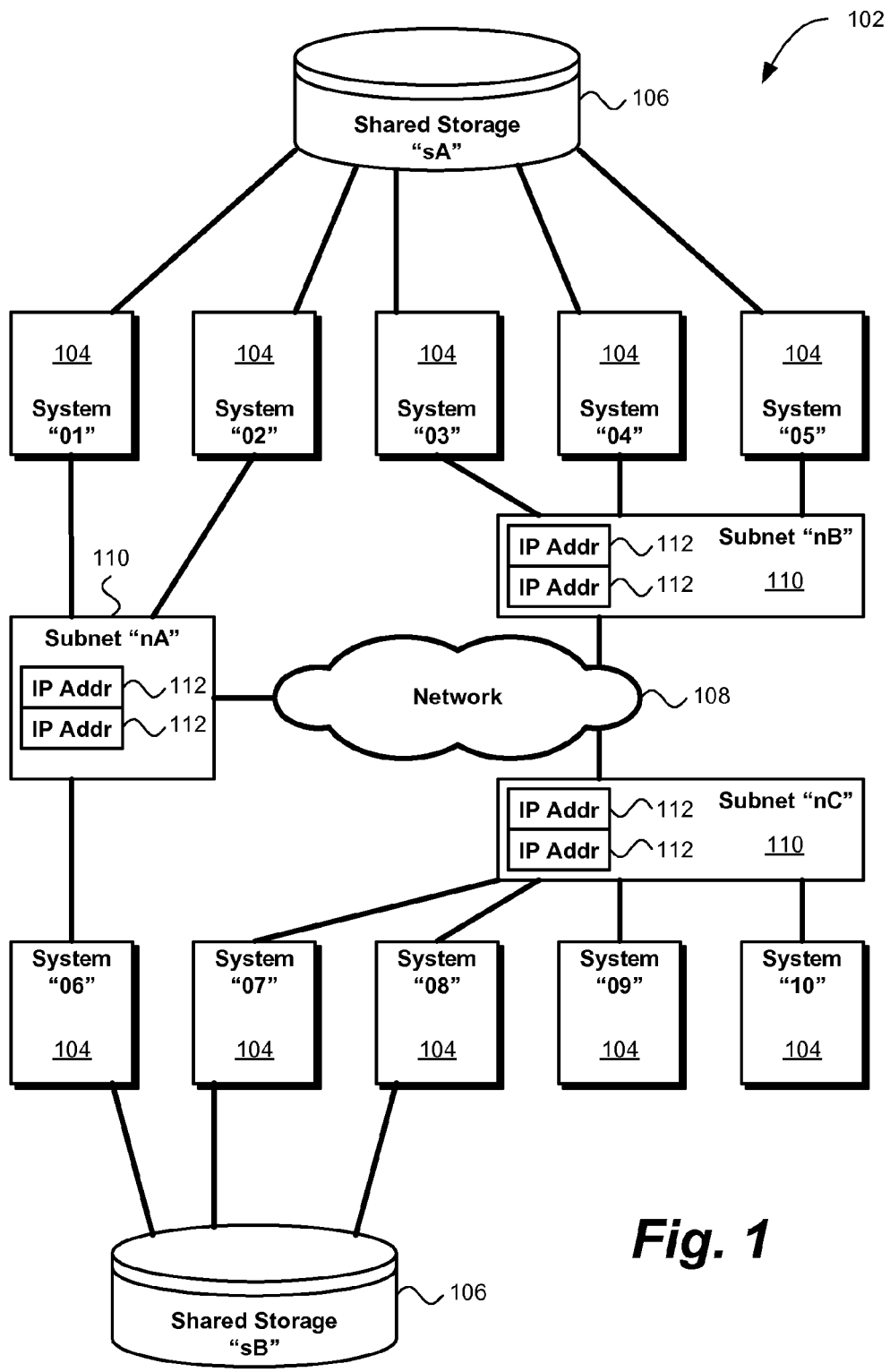
FIG. 1 shows an example environment embodying the present invention.

Turning to FIG. 1, an example environment 102 embodying the present invention is shown. It is initially noted that the environment is presented for illustration purposes only, and is representative of countless configurations in which the invention may be implemented. Thus, the present invention should not be construed as limited to the environment configurations shown and discussed herein.

The environment 102 may be managed by an owner, operator or administrator. The environment 102 may be implemented within a data center. In this case, all of the systems depicted in FIG. 1 may be located at the data center. The data center may be owned by a corporation, an educational institution, a government agency, any other type of organization or even an individual.

The environment 102 includes one or more physical computing systems 104. A physical computing system 104 may be configured to facilitate virtualization. More specifically, it is contemplated that the type of virtualization facilitated is platform virtualization. The platform virtualization may be full virtualization. The platform virtualization may also be operating system-level virtualization.

A physical computing system 104 may be a general purpose computer. Such a general purpose computer may incorporate any of a wide variety of architectures. Additionally, diverse hardware known in the art is capable of supporting virtualization. A physical computing system may be any machine or hardware device which is operable to execute computer code and is configured to support virtualization.

As a result of facilitating virtualization, a physical computing system 104 is configured to host one or more virtual machines. A virtual machine may be any subset of the overall computing resources included in the physical computing system 104. In the case of full virtualization, a virtual machine may be an operating system instance (OSI). In the case of operating system-level virtualization, a virtual machine may be a memory space. Further details applicable to the virtual machines thus hosted are discussed below in regard to FIG. 2.

In many cases, it is necessary to migrate a virtual machine from one physical computing system to another physical computing system. It is advantageous to perform any such migrations without stopping the virtual machine. Doing so beneficially ensures that any applications or services executing within the virtual machine are not interrupted. However, migrating a virtual machine without stopping it is generally only possible when specific circumstances are present.

It is emphasized that the environment 102 may also include physical computing systems 104 which are not configured to facilitate virtualization. Moreover, even if a physical computing system is configured to facilitate virtualization, it may not be actively hosting any virtual machines at a given point in time. In the interest of conciseness, FIG. 1 and the discussion thereof focus solely on those physical computing systems which actively host virtual machines.

The example environment 102 shown in FIG. 1 includes ten physical computing systems 104 which are allocated to host virtual machines. These physical computing systems are numbered consecutively from "01" to "10".

It is emphasized that the environment 102 may include more than ten physical computing systems 104. In fact, an arbitrary and possibly large number of physical computing systems may exist. Conversely, the environment may include fewer than ten physical computing systems.

The environment 102 further includes one or more shared storage systems 106. Each shared storage system is configured to store information in a computer usable format. Each shared storage system can potentially be accessed by more than one physical computing system 104. A physical computing system 104 which can access a shared storage system may read data therefrom and write data thereto. Such reading and writing may be indirect, e.g., the physical computing system may instruct another device to perform the reading operation or the writing operation.

A shared storage system 106 may include any of various storage media known in the art. Such storage media may include without limitation magnetic, optical, or semiconductor systems, apparatuses, or devices. More specifically, such storage media may include without limitation hard drives, magnetic drives, optical drives, portable computer diskettes accessed via floppy drives, compact discs accessed via compact disc drives, random access memory (RAM), erasable programmable read-only memory (EPROM or Flash memory), magnetic memory and optical memory. In particular, a storage medium included in a shared storage system may be a computer usable or computer readable memory.

The example environment 102 shown in FIG. 1 includes two shared storage systems 106. These shared storage systems are denoted "sA" and "sB".

It is emphasized that the environment 102 may include more than two shared storage systems 106. In fact, an arbitrary and possibly large number of shared storage systems may exist. Conversely, the environment may include only a single shared storage system which is accessed by all of the physical computing systems 104 included in the environment.

The environment 102 may additionally include storage systems which are not shared. In particular, any or all of the physical computing systems 104 may include an internal, local, non-shared storage system. This non-shared storage system is accessed only by the physical computing system in which it is included. A physical computing system may have a non-shared storage system even if it can also access one or more shared storage systems. In the example environment 102 shown in FIG. 1, each physical computing system includes an internal, local, non-shared storage system.

The environment 102 further includes a network 108. The network may be any of a wide variety of systems known in the art for allowing two or more systems to communicate. The network may comprise any of a wide variety of networks such as the Internet, the public switched telephone network (PSTN), local area networks (LAN's) and wide area networks (WAN's). The network may employ any of a wide variety of network technologies such as Ethernet, IEEE 802.11, IEEE 802.16, the Bluetooth® technology, token ring, Digital Subscriber Line (DSL), cable Internet access, satellite Internet access, Integrated Services Digital Network (ISDN) and dial-up Internet access. Bluetooth is a registered trademark of Bluetooth SIG, Inc., Bellevue, Wash., United States. The network may include various topologies and protocols known to those skilled in the art, such as TCP/IP, UDP, and Voice over Internet Protocol (VoIP). The network may comprise direct physical connections, radio waves, microwaves or any combination thereof. Furthermore, the network may include various networking devices known to those skilled in the art, such as routers, switches, bridges, repeaters, etc.

The network 108 may comprise one or more subnets 110. A subnet may be a network segment.

Each subnet 110 may have one or more Internet Protocol (IP) addresses 112 available for use. The IP addresses may be, for example, IPv4 addresses, IPv6 addresses or a combination thereof. It is contemplated that the number of IP addresses available for use within each subnet is finite and limited. The number of IP addresses available within a subnet may be a fixed quantity.

In many network configurations known in the art, IP addresses exist exclusively within the subnet 110 in which they are available and are not transferable to any other subnet. IP addresses may be unusable on any other subnet other than the one in which they are available. For example, if all IPv4 addresses beginning with a specific 25-bit value are routed to a specific subnet, an IP address beginning with that 25-bit value is generally only usable within that subnet. It is noted that while techniques exist to mitigate this problem, they are challenging to implement in practice.

The example network 108 shown in FIG. 1 includes three subnets 110. These subnets are denoted "nA", "nB" and "nC". Each subnet has 128 IP addresses available for use. As described above, these IP addresses cannot be transferred from one subnet to another subnet. It is noted that the display of only two IP addresses per subnet in FIG. 1 is solely due to space considerations.

It is emphasized that the network 108 may include more than three subnets 110. In fact, an arbitrary and possibly large number of subnets may exist. For example, many data centers have many networks, many subnets thereof and many IP addresses 112.

Conversely, the network 108 may include fewer than three subnets 110. In fact, the network may not be subdivided into subnets at all. In this case, the network can be considered to have a single subnet which encompasses the entire network.

It is emphasized that despite the existence of any subnets 110, all of the systems included in the environment 102 may be able to interact via the network 108. Thus, the environment may be considered to exist within a computer network.

In the example environment 102 shown in FIG. 1, the physical computing systems 104 are heterogeneously connected to the storage systems. Specifically, physical computing systems "01" through "05" are connected to shared storage system "sA". Physical computing systems "06" through "08" are connected to shared storage system "sB". Physical computing systems "09" and "10" are not connected to any shared storage system.

As noted above, each physical computing system 104 additionally includes a non-shared storage system. Thus, physical computing systems "01" through "08" are connected to both a shared storage system and their non-shared storage system. Physical computing systems "09" and "10" are connected to only their non-shared storage systems. As a result, physical computing systems "01" through "05" can freely exchange data via the shared storage system "sA". Similarly, physical computing systems "06" through "08" can freely exchange data via the shared storage system "sB". However, the physical computing systems connected to the shared storage system "sA" cannot freely exchange data with the physical computing systems connected to the shared storage system "sB", and vice versa. For example, physical computing systems "06" through "08" cannot freely exchange data with physical computing systems "01" through "05", as the latter are connected to the shared storage system "sA". Additionally, physical computing systems "09" and "10" cannot freely exchange data with any other physical computing system, including each other.

Moreover, the physical computing systems 104 are heterogeneously connected to the network subnets 110. Specifically, physical computing systems "01", "02" and "06" are connected to subnet "nA". Physical computing systems "03" through "05" are connected to subnet "nB". Physical computing systems "07" through "10" are connected to subnet "nC".

It is noted that there is no inherent relationship between the shared storage system 106 to which a physical computing system 104 is connected and the subnet 110 to which the physical computing system is connected.

It is emphasized that a physical computing system 104 may be connected to more than one shared storage system 106. Likewise, a physical computing system may be connected to more than one subnet 110.

It is emphasized that the hardware devices included in the environment 102 may not be homogeneous. Data centers rarely have a simple, homogeneous construction wherein the physical computing systems are all nearly identical to each other and are all connected to the same shared storage system. Instead, most data centers include computing systems and hardware devices which are heterogeneous. This often occurs because data centers typically expand over time in an inconsistent, ad hoc manner. For example, a storage system may run out of free space, necessitating the purchase of a separate storage system.

In particular, the hardware devices, notably the physical computing systems 104, may not be homogeneously connected to storage providers such as the shared storage systems 106. Similarly, the hardware devices and physical computing systems 104 may not be homogeneously connected to network subnets 110.

Heterogeneity of the aforementioned factors affects the amount of flexibility available to the owner or operator of the physical computing systems 104 in managing the virtual machines hosted thereat. In general, increased heterogeneity results in less flexibility. Notably, heterogeneity in these factors impacts the ability to migrate a virtual machine to a different physical computing system without stopping the virtual machine.

Figure 2:
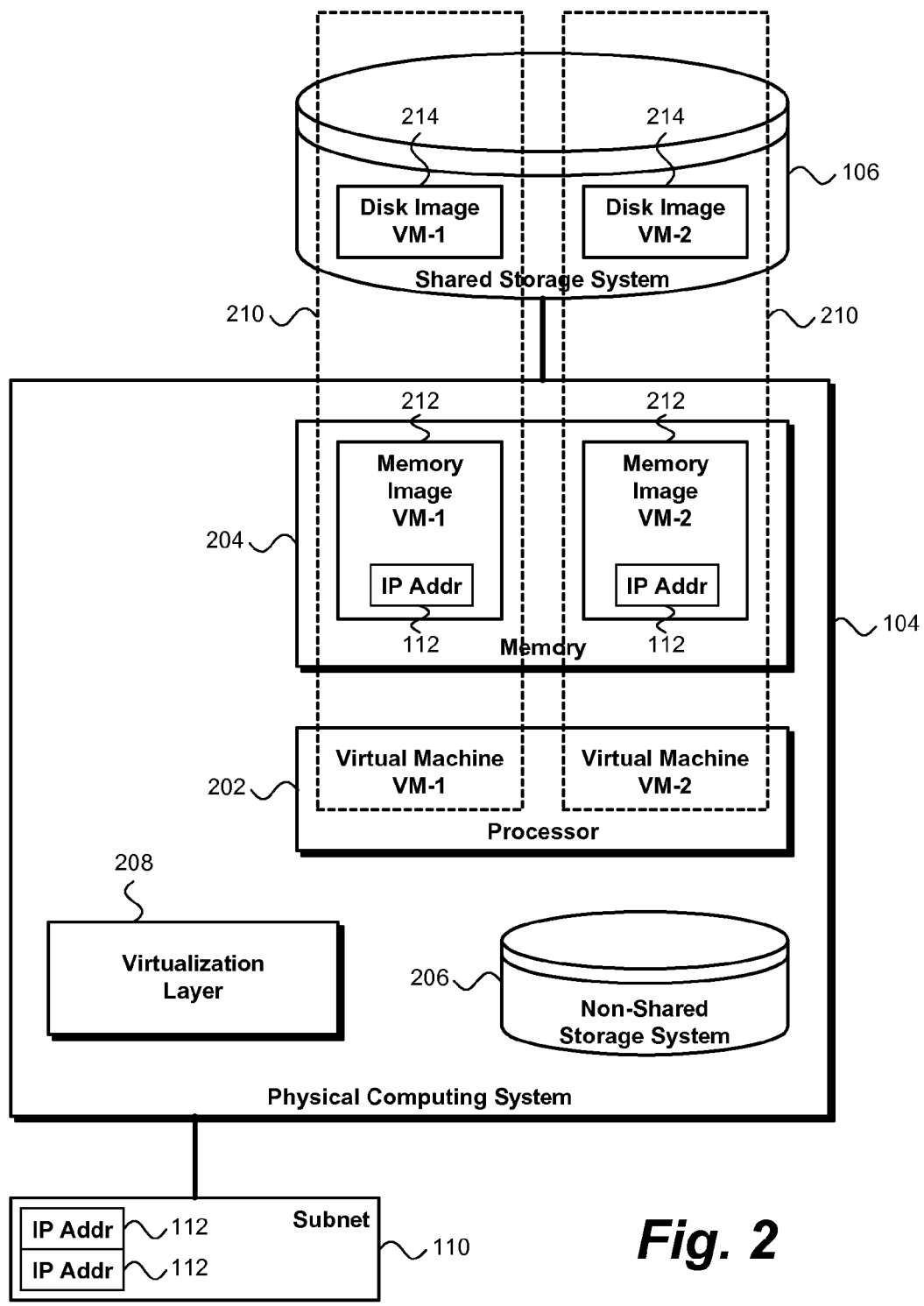
FIG. 2 illustrates additional detail about an example physical computing system.

Turning now to FIG. 2, additional detail about an example physical computing system is illustrated.

It is emphasized that any or all of the physical computing systems 104 included in the environment may have the properties described below. In the example environment shown in FIG. 1, all of the physical computing systems have the properties described below.

The physical computing system 104 comprises one or more processors 202. Specifically, a processor may be a general purpose microprocessor. A processor may also be a specialized logic device. Each processor is configured to execute program code.

The physical computing system 104 further comprises memory 204. The memory is computer usable and computer readable. The memory is configured to store information in a computer usable format. The stored information may include program code which is executed by any of the processors 202. The stored information may also include data on which the program code operates. The memory may include any of a variety of technological devices configured to store data. Such technological devices may include without limitation random access memory (RAM), read-only memory (ROM), erasable programmable read-only memory (EPROM or Flash memory), magnetic memory and optical memory.

The physical computing system 104 further includes at least one local, non-shared storage system 206. The non-shared storage system 206 is configured to store information in a computer usable format. The physical computing system may read data from the non-shared storage system and write data to the non-shared storage system. Such reading and writing may be indirect, e.g., the physical computing system may instruct another device to perform the reading operation or the writing operation. However, other physical computing systems present in the environment cannot access the non-shared storage system. In an embodiment of the present invention, the non-shared storage system is internal to the physical computing system.

A non-shared storage system 206 may include any of various storage media known in the art. Such storage media may include without limitation magnetic, optical, or semiconductor systems, apparatuses, or devices. More specifically, such storage media may include without limitation hard drives, magnetic drives, optical drives, portable computer diskettes accessed via floppy drives, compact discs accessed via compact disc drives, random access memory (RAM), erasable programmable read-only memory (EPROM or Flash memory), magnetic memory and optical memory. In particular, a storage medium included in a non-shared storage system may be a computer usable or computer readable memory.

The physical computing system 104 may be connected to a variety of peripheral devices. Such peripheral devices may include a keyboard, a mouse and a display.

The physical computing system 104 is configured to facilitate platform virtualization. The specific types of platform virtualization implemented may include full virtualization, operating system-level virtualization and any other type of virtualization known in the art. Moreover, different types of virtualization may simultaneously coexist on the same physical computing system.

To achieve this goal, the physical computing system 104 may incorporate any of a variety of virtualization layers 208. As used herein, the term "virtualization layer" includes any technological device configured to implement platform virtualization. A virtualization layer may be implemented in software, hardware or a combination thereof.

A virtualization layer 208 may be configured to implement full virtualization. Virtualization layers implementing full virtualization include without limitation the IBM Dynamic Logical Partitioning (DLPAR) technology on pSeries® servers and zSeries® servers, the IBM z/VM® hypervisor, the VMware® ESX™ hypervisor and other technologies in the VMware family of products, the Citrix® XenServer™ virtualization platform, the Citrix Xen® hypervisor and the Kernel-based Virtual Machine (KVM) kernel virtualization infrastructure for the Linux® operating system. pSeries, zSeries and z/VM are registered trademarks of International Business Machines Corporation, Armonk, N.Y., United States, in the United States, other countries, or both. VMware and ESX are registered trademarks or trademarks of VMware, Inc., Palo Alto, Calif., United States, in the United States and/or other jurisdictions. Citrix, XenServer and Xen are trademarks of Citrix Systems, Inc., Fort Lauderdale, Fla., United States, and/or one or more of its subsidiaries, and may be registered in the United States Patent and Trademark Office and in other countries. Linux® is the registered trademark of Linus Torvalds in the United States and other countries.

A virtualization layer 208 may, instead or additionally, be configured to implement operating system-level virtualization. Virtualization layers implementing operating system-level virtualization include without limitation the IBM Workload Partitioning (WPAR) technology for the AIX® operating system, the Sun™ Solaris™ Containers technology and the VServers technology for the Linux operating system. AIX is a registered trademark of International Business Machines Corporation, Armonk, N.Y., United States, in the United States, other countries, or both. Sun and Solaris are trademarks or registered trademarks of Sun Microsystems, Inc., Santa Clara, Calif., United States, or its subsidiaries in the United States and other countries.

The virtualization layer 208 enables the installation of one or more virtual machines 210 at the physical computing system 104. Virtual machines thus installed are hosted at the physical computing system. The number of virtual machines hosted on a single physical computing system can be very large. Some very large computing systems known in the art can simultaneously host thousands of virtual machines.

A virtual machine 210 may be any subset of the overall computing resources included in the physical computing system 104. In the case of full virtualization, a virtual machine may be an OSI. In the case of operating system-level virtualization, a virtual machine may be a space. A virtual machine may also be any of a variety of other types of virtual machines known in the art. Different types of virtual machines may coexist within the same physical computing system. In an embodiment of the present invention, a virtual machine is a Logical Partition (LPAR) in the context of the IBM DLPAR technology.

It is contemplated that the virtual machines 210 executing in a single physical computing system 104 are isolated from each other. A virtual machine thus cannot interfere with the resources associated with another virtual machine. Isolating the virtual machines from each other advantageously increases the stability and the security of the system.

The virtualization layer 208 exists at a layer above hardware devices included in the physical computing system 104. It is noted, however, that the virtualization layer 208 may employ features of a processor 202 or another hardware device which is configured to facilitate virtualization. Conversely, the virtualization layer exists at a layer below the virtual machines 210. Thus, in the case of full virtualization, the virtualization layer exists at a layer below the operating systems executing within the virtual machines. The virtualization layer may multiplex the hardware of the physical computing system to each of the different operating systems.

The virtualization layer 208 may control the resources of the physical computing system 104. Notably, the virtualization layer may allocate resources among the virtual machines 210. For example, the virtualization layer may allow the specification of the amount of CPU time and the amount of memory allocated to each virtual machine.

In the example physical computing system 104 shown in FIG. 2, the virtual machines 210 are operating system instances (OSI's). This is the case for all of the physical computing systems shown in the example environment of FIG. 1.

In the example physical computing system 104 shown in FIG. 2, two virtual machines 210 are currently executing. These virtual machines are denoted "VM-1" and "VM-2" in FIG. 2.

It is emphasized that a physical computing system 104 may host more than two virtual machines 210 at a given point in time. In fact, an arbitrary and possibly large number of virtual machines may execute simultaneously at a physical computing system. Conversely, a physical computing system may have only one virtual machine, or even no virtual machines, executing at a given point in time.

It is emphasized that the present invention is not limited to full virtualization. Accordingly, virtual machines 210 are not required to be OSI's. Instead, those skilled in the art may apply the principles of the present invention to other types of virtualization and other types of virtual machines.

Program code may execute within a virtual machine 210. In general, the virtual machine is operable to execute program code which is designed to execute on top of the architecture of the physical computing system 104 hosting the virtual machine. The program code may even be unaware that it is executing within a virtual machine, as opposed to directly on top of the physical computing system. Program code executing within a virtual machine may execute at a processor 202.

Diverse program code can execute within a virtual machine 210. The program code may be designed to accomplish any of a wide variety of goals. In furtherance of these goals, the program code may perform any of a wide variety of operations. The program code may be compiled, may be interpreted or may be a combination thereof. The program code may be expressed in any of a variety of programming languages known in the art. Specifically, the program code may be written in an object oriented programming language such as the Java™ programming language, the "C++" programming language or the like. Java is a trademark or registered trademark of Sun Microsystems, Inc., Santa Clara, Calif., United States, or its subsidiaries in the United States and other countries. The program code may also be written in a conventional procedural programming language, such as the "C" programming language or similar programming languages. The program code may also be written in a multi-paradigm programming language, such as the Python® programming language or similar programming languages. Python is a registered trademark of the Python Software Foundation, Hampton, N.H., United States.

An operating system executes within a virtual machine 210 which is an OSI. In this case, program code executing within the virtual machine executes on top of this operating system. In general, virtual machines which are OSI's are operable to execute operating systems which are designed to execute on top of the architecture of the physical computing system 104 hosting the virtual machine. The operating system may even be unaware that it is executing within a virtual machine, as opposed to directly on top of the physical computing system.

Diverse operating systems can execute within a virtual machine 210. These operating systems may include without limitation general purpose operating systems such as the IBM z/OS® operating system, the IBM AIX operating system, the Linux operating system, any flavor of the UNIX® operating system or the Windows® operating system. z/OS is a registered trademark of International Business Machines Corporation, Armonk, N.Y., United States, in the United States, other countries, or both. UNIX is a registered trademark of The Open Group in the United States and other countries. Windows is a registered trademark of Microsoft Corporation, Redmond, Wash., United States, in the United States and/or other countries.

Under full virtualization, a memory image 212 is associated with each virtual machine 210. A memory image is a subset of the memory 204 of the physical computing system 104. It is contemplated that each virtual machine is prevented from accessing any of the memory of the physical computing system other than the memory image with which it is associated. Similarly, it is contemplated that the memory image associated with a given virtual machine cannot be accessed by other virtual machines executing on the physical computing system.

In fact, program code and operating systems executing within a virtual machine 210 may detect the memory image 212 as being the entirety of the available memory. In the example physical computing system 104 shown in FIG. 2, the memory 204 includes 4 gigabytes of random access memory. Each virtual machine is associated with a memory image which is 512 megabytes in size. Thus, program code executing within one of the virtual machines detects that 512 megabytes of memory (as opposed to 4 gigabytes) are available.

The memory image 212 may include program code which is included in the virtual machine. This program code may be executed at the processor 202 as noted above.

Under full virtualization, a disk image 214 is associated with each virtual machine 210. The disk image is contained in a subset of the storage space accessible by the physical computing system 104. It is contemplated that each virtual machine is prevented from accessing any of the storage space accessible by the physical computing system other than the disk image with which it is associated. Similarly, it is contemplated that the disk image associated with a given virtual machine cannot be accessed by other virtual machines executing on the physical computing system.

In an embodiment of the present invention, a disk image 214 is a file stored at a storage system. The storage system may be a shared storage system 106 such as either of the shared storage systems shown in FIG. 1. The storage medium may instead be a non-shared storage system 206. The file may be stored within a standard file system implemented in the storage system. The file may be very large in size.

Full virtualization generally causes a virtual hard drive to be implemented. A virtual machine 210, and even the operating system executing therein, perceives that the virtual hard drive is a real hard drive. The virtualization system in fact implements the virtual hard drive by mapping. Specifically, the virtual hard drive is mapped to the disk image 214. As a result, when the virtual machine writes to a specific location in the virtual hard drive, the corresponding location in the disk image is updated. When the virtual machine reads from a specific location in the virtual hard drive, data at the corresponding location of the disk image is read.

In a further embodiment of the present invention, more than one disk image 212 is implemented. Thus, a virtual machine 210 has one virtual hard drive for each disk image. It is noted that while subsequent discussion addresses only a single disk image, this is the case solely for brevity and clarity. In any case wherein a virtual machine has multiple disk images, the operations and properties described can be applied to each of the disk images for the virtual machine.

Program code and operating systems executing within the virtual machine 210 may detect the virtual hard drive as being the entirety of the available storage space. In the example physical computing system 104 shown in FIG. 2, each virtual machine has one associated disk image 214. Each disk image is 20 gigabytes. Each virtual hard drive is therefore 20 gigabytes in size. Thus, program code executing within a virtual machine detects that 20 gigabytes of storage space are available. This is the case even if the physical computing system is connected to storage systems with a combined capacity of 500 gigabytes.

As the virtual machine 210 executes, information may be transferred from the disk image 214 to the memory image 212. This information may include program code which is executed at the processor 202 as described above. Information may also be transferred from the memory image to the disk image.

A virtual machine 210 may be configured to interact with a specific network subnet 110. Specifically, the virtual machine may be configured to employ one or more IP addresses 112. For the reasons previously noted, IP addresses may exist only within one specific subnet. Therefore, a virtual machine cannot easily be migrated from a physical computing system on one subnet to a physical computing system on a different subnet. Specifically, the virtual machine may require reconfiguration in this case. At a minimum, this reconfiguration includes assigning to the virtual machine a new IP address which exists within the new subnet. If this reconfiguration is not performed, it may be impossible to access the virtual machine once it has been migrated to the new subnet. It may even be impossible to perform the migration at all.

It is noted that reconfiguring a virtual machine 210 in response to migration to a different network subnet 110 is problematic in some environments. One possible reason is that an administrator of the environment may be unable to access the internals of the virtual machine. Another possible reason is that the administrator may be unfamiliar with the software executing within the virtual machine. It is therefore advantageous to avoid reconfiguring virtual machines to operate on a different subnet when migrating virtual machines in general.

Additional concepts regarding virtualization are now introduced in view of both the environment-level view of FIG. 1 and the detailed view of FIG. 2.

Data centers known in the art frequently have an average CPU utilization ratio which is as low as ten percent. Thus, the CPU or CPU's of a specific physical computing system 104 may be idle most of the time. There are many possible reasons why this condition may exist. Frequently, different software products are installed in separate physical computing systems to ensure that the software products do not interfere with each other. Also, the CPU usage of a software product may vary significantly over time. For example, a software product may periodically require the majority of available processing power to handle spikes in workload. The software product may be mostly idle at other times.

In many cases, a single virtual machine 210 can replace an entire physical computing system. Multiple virtual machines, each replacing a physical computing system 104, can then execute on a single physical computing system. For example, suppose that five physical computing systems each have an average CPU utilization of ten percent. It may be possible to replace each of the five physical computing systems with a virtual machine. All five virtual machines may then execute on the same physical computing system. As a result, the five physical computing systems are combined into a single physical computing system, avoiding the need for four physical computing systems. Employing virtualization to combine a larger number of physical computing systems into a smaller number of physical computing systems is known in the art as consolidation.

Through consolidation, virtualization beneficially allows the number of physical computing systems 104 required for a data center to be decreased. Because fewer physical computing systems are needed, the amounts of electrical power, physical space and cooling required are advantageously reduced. It is noted that these advantages are contributing to the recent resurgence of virtualization.

As described above, virtual machines 210 are generally isolated from each other. Therefore, even if a software product may potentially interfere with other software products, the software product can still safely execute within a virtual machine. Virtual machines executing such software products can therefore safely be consolidated. As a result, the advantages of virtualization can be realized even for software products which may potentially interfere with other software products.

Moreover, even if a software product periodically experiences spikes in workload (and therefore CPU utilization), it may still be possible to consolidate the virtual machine 210 executing the software product with other virtual machines. Many virtual machines have predictable utilization patterns. In particular, the spikes in workload and CPU utilization may happen at predictable times, such as at specific times of the day. In many cases, a group of software products, each of which has periodic spikes in CPU utilization, can be selected so that the spikes do not overlap. Virtual machines executing each software product in the group can then be consolidated onto the same physical computing system 104. As a result, the advantages of virtualization can be realized even for software products which periodically require large amounts of processing power.

To illustrate, consider two example physical computing systems 104. The first physical computing system generates a report between 3 AM and 4 AM every day. The second physical computing system generates a different report between 5 AM and 6 AM every day. Both systems consume all available processing power while generating their respective reports but are mostly idle at other times. These two systems can safely be consolidated, as the spikes in workload do not overlap.

Unfortunately, consolidation results in a risk of a phenomenon known in the art as overconsolidation. Overconsolidation is an inability, as a result of consolidation, to handle spikes in workload. Whether a physical computing system 104 has sufficient processing power to acceptably execute all of the virtual machines 210 hosted thereat depends on the actual usage patterns of each virtual machine. These usage patterns are not always known a priori. Therefore, overconsolidation is difficult to avoid in many cases.

If overconsolidation occurs at a physical computing system 104, one solution is to migrate one or more virtual machines 210 executing thereat to other physical computing systems. Doing so lowers the overall load of the physical computing system experiencing overconsolidation. Ideally, this physical computing system has sufficient computing resources to execute the remaining virtual machines. Additionally, the migrated virtual machines are ideally placed at a physical computing system with available computing resources. Therefore, the receiving physical computing system ideally is able to execute both the migrated virtual machines and any virtual machines already executing thereat.

When a virtual machine 210 must be migrated for any reason, it is advantageous if the migration is a live migration. Live migration is the act of moving a virtual machine from one physical computing system 104 to a different physical computing system while the virtual machine continues to execute. As a result, the virtual machine simply continues executing on the destination physical computing system from the point where it was interrupted on the originating physical computing system. Notably, the migrated virtual machine is not stopped. Service to any applications executing therein is therefore not interrupted. It is contemplated that any period of time for which execution of the virtual machine is suspended is very short. An example of live migration is the partition mobility functionality implemented by the IBM DLPAR technology.

Live migration generally includes transferring the memory image 212 of the virtual machine 210 from the originating physical computing system 104 to the destination physical computing system. The memory image is relatively small. Therefore, transferring the memory image can generally be performed in a relatively short period of time. Therefore, it is contemplated that the memory image can be transferred without interrupting service to the virtual machine being migrated.

By contrast, the disk image 214 of the virtual machine 210 is typically very large. In this case, the amount of time required to transfer the disk image from one storage system 106, 206 to another storage system is generally significant. Because of the length of time required, it is contemplated that transferring the disk image without interrupting service to the virtual machine being migrated is difficult or impossible. This is particularly true in light of the fact that the time required to perform other necessary subtasks, such as transferring the memory image 212, must also be taken into account.

Therefore, it is contemplated that a precondition which must hold true for live migration to be performed is that both the original physical computing system 104 and the destination physical computing system are connected to a common storage system 106.

Moreover, this precondition generally includes an additional requirement that the disk image 214 of the virtual machine 210 being migrated is stored at this common storage system 106. Even when such a common storage system exists, the disk image may be stored elsewhere. In this case, the destination physical computing system may nonetheless be unable to access the disk image unless it is transferred.

When this precondition (including the additional requirement) holds true, both the originating physical computing system 104 and the destination physical computing system can access the disk image 214. Therefore, it is unnecessary to transfer the disk image. Instead, live migration can be achieved by continuing to point to the same file or other storage location which contains the disk image even as the virtual machine 210 is migrated to a different physical computing system.

Another precondition which may be required to hold true for live migration to be performed is that the originating physical computing system 104 and the destination physical computing system are connected to a common network subnet 110. This is required because, for the reasons previously noted, a virtual machine 210 may require reconfiguration if it is migrated across subnets. In many environments, this reconfiguration requires restarting the virtual machine. The need to restart the virtual machine clearly precludes live migration.

It is emphasized that the preconditions described above are not exhaustive. Any number of other preconditions may be required to hold true for live migration to be performed. The specific preconditions required may depend on the environment 102 in which the virtual machines 210 execute and the requirements imposed by this environment.

It is further emphasized that the storage system 106, 206 at which the disk image 214 for a virtual machine 210 is stored affects the possible destinations to which live migration of the virtual machine is subsequently possible. Likewise, the network subnet 110 which can be accessed by the physical computing system 104 executing the virtual machine also impacts the possible destinations for subsequent live migration.

More generally, as previously noted, the heterogeneity of the computing systems and hardware devices included in the environment 102 affects the amount of flexibility in managing the virtual machines 210 hosted therein. Consider, for example, a simple, homogeneous data center where all of the physical computing systems 104 are nearly identical and are connected to the same storage system 106 and network subnet 110. In this data center, the disk images 214 could be simply placed on the shared storage system. Live migration could then be performed involving any combination of physical computing systems. However, as previously noted, data centers are rarely as simple as in this example. Thus, the preconditions noted above enable management of the heterogeneity of environments implementing virtualization. Moreover, additional preconditions may be required to manage other properties in which an environment is heterogeneous.

In the example environment 102 shown in FIG. 1, both preconditions described in detail above must hold for live migration to occur. In other words, both physical computing systems 104 must be connected to a common storage system 106 and a common network subnet 110. Therefore, if an administrator requires that a virtual machine 210 is migrated to a different physical computing system, two checks must be performed to determine whether the migration can be performed as a live migration.

The first check is to determine whether both physical computing systems 104 are connected to a common network subnet 110. If this condition holds, the decision process can continue with the second check. Otherwise, live migration is precluded. This is because the virtual machine 210 must be reconfigured to operate on a different subnet. In the example environment 102, the administrator cannot access the virtual machine in order to perform this reconfiguration. It is noted that even if this were not the case, such reconfiguration is likely to require stopping the virtual machine, which precludes live migration.

The second check is to determine whether both physical computing systems 104 are connected to a common storage system 106. If this condition holds, live migration can be performed with no downtime or with minimal downtime. Otherwise, live migration is precluded. This is because the disk image 214 for the virtual machine 210 must be transferred between storage systems. In the example environment 102, performing such a transfer requires stopping the virtual machine due to the length of time required to perform the transfer. Therefore, it is necessary to first shut down the virtual machine. Then, the disk image and the configuration can be transferred to a storage system to which the destination physical computing system is connected. Finally, the virtual machine can be restarted.

Assuming that the only preconditions to live migration are as described above, live migration can occur between physical computing systems "01" and "02". Live migration can also occur between any two of physical computing systems "03", "04" and "05". Live migration can also occur between physical computing systems "07" and "08". This is possible because the combinations of physical computing systems 104 noted share both a common storage system 106 and a common network subnet 110.

Live migration is not possible with any other combination of physical computing systems. However, migration can occur between some combinations of physical computing systems with downtime but without the need for reconfiguration. This is the case for migration from either of physical computing system "01" and "02" to physical computing system "06", and vice versa. This is also the case for migration from either of physical computing systems "07" and "08" to either of physical computing systems "09" and "10", and vice versa. This is possible because the combinations of physical computing systems 104 noted share a common network subnet 110 but have disjoint storage systems 106, 206.

Migration involving any other combination of physical computing systems requires reconfiguration of the virtual machine. This is the case because in any other combination of physical computing systems 104, the network subnets 110 are disjoint.

Figure 3:
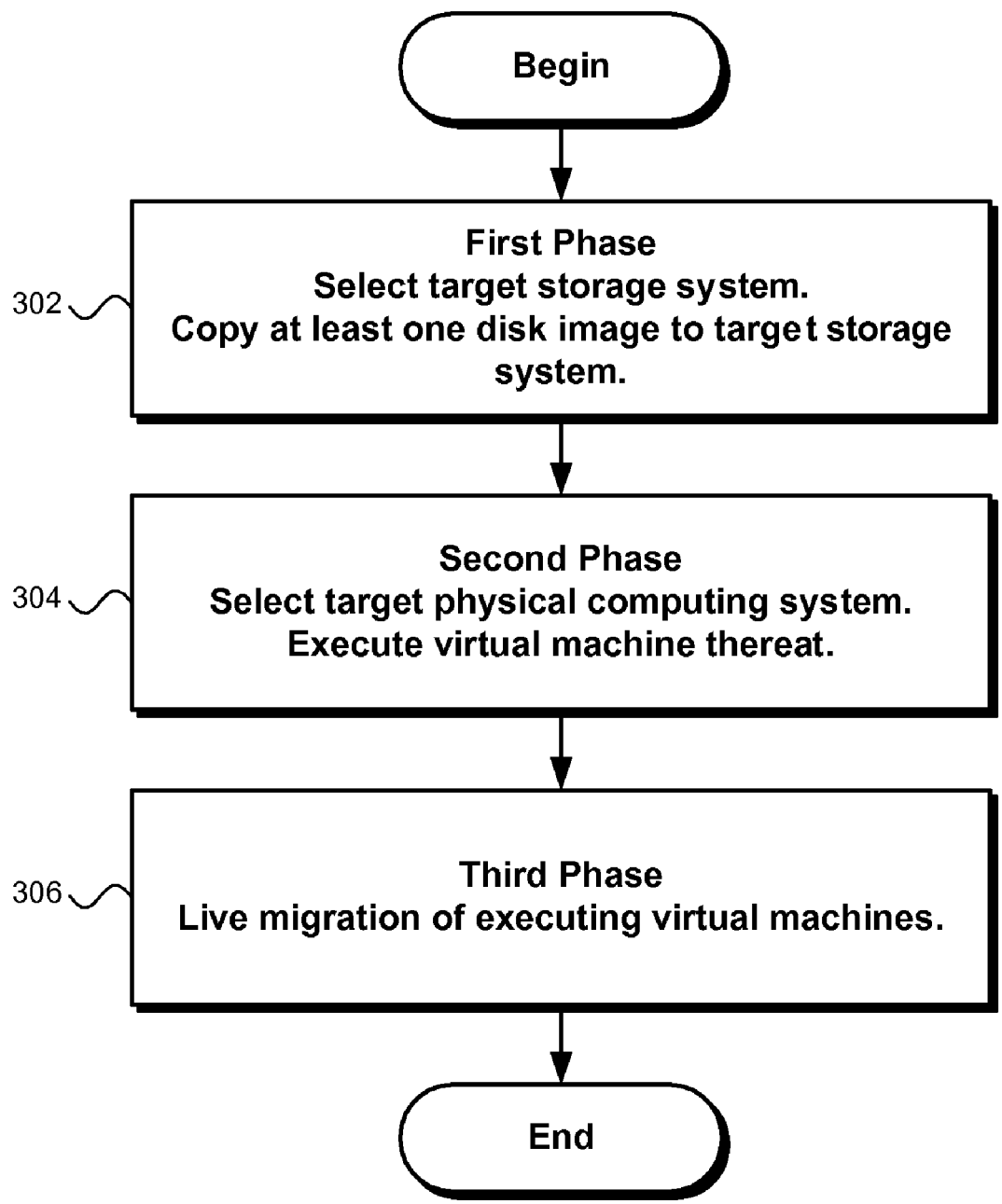
FIG. 3 demonstrates an example flowchart of the phases of a placement decision.

Turning now to FIG. 3, an example flowchart of the phases of a placement decision is demonstrated.

The phases shown in FIG. 3 exist within an environment such as the environment shown in FIGS. 1-2 and described above in regard to FIGS. 1-2. The processing tasks which must be handled by this environment are likely to change over time. Therefore, it is likely to be necessary to periodically add new virtual machines so that they execute within this environment.

In order to add a new virtual machine to the environment, it is necessary to select a physical computing system at which the virtual machine is to initially execute. It is noted that the decision as to which specific physical computing system is to host a virtual machine is known as a placement decision.

A virtual machine for which a placement decision is made may be the virtual machine shown in FIG. 2 and may have any of the properties described above in regard to FIG. 2. Similarly, the physical computing systems considered during the placement decision may be any of the physical computing systems shown in FIGS. 1-2 and may have any of the properties described above in regard to FIGS. 1-2.

It is emphasized that after the initial placement decision, the virtual machine may be migrated to a different physical computing system. However, the placement decision impacts the flexibility with which the virtual machine can subsequently be migrated. Broadly speaking, a goal of the placement decision may thus be to maximize this flexibility. The techniques described herein advantageously maximize this flexibility.

Another goal of the placement decision may be to, for a given number of migrations which are performed, maximize the number of live migrations and minimize the number of migrations which are not live migrations. In other words, the goal may be to maximize the probability that any given migration can be performed as a live migration. This goal directly follows from the fact that a goal of many data centers is to minimize downtime. Live migrations do not result in downtime, while other migrations do result in downtime. The techniques described herein beneficially increase the probability that a given migration can be performed as a live migration. As a result, the risk that a migration requires interrupting service to the migrated virtual machine is beneficially decreased.

It is noted that reducing the actual number of migrations may not be a goal per se. Migrations are often inherently necessary. Moreover, the negative effects of a live migration are usually minimal. Performing a live migration generally requires relatively few resources and results in no downtime. Therefore, avoiding migrations which are not live migrations may be of far greater importance than avoiding migrations at all.

Another goal of the placement decision may be to maximize the number of configuration changes, including performance-related changes, which can be performed without stopping the virtual machine. The techniques described herein beneficially assist in achieving this goal as well.

It is emphasized that human intervention is not inherently required to perform the phases shown in FIG. 3. Therefore, the intelligent autonomic management of virtual machines may be implemented according to the phases shown in FIG. 3.

At the first phase 302, a "pool" within which the virtual machine is to execute is selected. A pool includes a subset of the physical computing systems included in the environment.

It is emphasized that the specific physical computing system at which the virtual machine is to execute is not generally selected at the first phase 302. However, a pool including only one physical computing system may be selected at this phase.

The pools may have been created prior to the first phase 302. In this case, the first phase 302 is performed based on the previously created pools. The pools reflect the hardware included in the environment. This hardware may remain relatively static. Therefore, the pools themselves may remain relatively static.

In an embodiment of the present invention, each pool includes a storage system as well as all of the physical computing systems which can access the storage system.

According to this embodiment, the example environment shown in FIG. 1 is divided into four pools. Physical computing systems "01" through "05" and shared storage system "sA" are assigned to one pool. Physical computing systems "06" through "08" and shared storage system "sB" are assigned to a different pool. Another pool includes only physical computing system "09" and the non-shared storage system included therein. Yet another pool includes only physical computing system "10" and the non-shared storage system included therein.

In another embodiment of the present invention, the physical computing systems included in the environment are divided into pools such that migration of a virtual machine from any physical computing system included in the pool to any other physical computing system included in the same pool can be performed as a live migration.

Pools may be created so that all of the preconditions for live migration are fulfilled for any combination of physical computing systems included in the pool. In general, any resources which affect whether live migration is possible between two physical computing systems may be considered in dividing the physical computing systems into pools.

As noted above, it is contemplated that a precondition which must hold true for live migration to be performed is that both the original physical computing system and the destination physical computing system are connected to a common storage system. Accordingly, the physical computing systems may be divided into pools so that each physical computing system included in any pool can access at least one common storage system. The pool may be considered to include any storage system accessible to each physical computing system included in the pool.

A pool may include only a single physical computing system. It is possible for a single physical computing system which is so included to be unable to access any shared storage systems. Instead, the physical computing system may be connected only to a non-shared storage system which is local to the physical computing system. The pool may thus include the non-shared storage system.

As noted above, another precondition which may be required to hold true for live migration to be performed is that the originating physical computing system and the destination physical computing system are connected to a common network subnet. Accordingly, the physical computing systems may be divided into pools so that each physical computing system included in a specific pool can access at least one common network subnet.

The factors considered in creating the pools may not be limited to storage and network connectivity. For example, differences in hardware architecture may also be considered. Thus, the pools may be created such that all physical computing systems included in the same pool are homogeneous in terms of important facets of the hardware architecture.

According to this embodiment, the example environment shown in FIG. 1 is divided into six pools. Physical computing systems "01" and "02" are assigned to one pool. Physical computing systems "03" through "05" are assigned to a different pool. Physical computing systems "07" and "08" are assigned to yet another pool. Physical computing systems "06", "09" and "10" are each assigned to their own pools.

At the first phase 302, the target storage system at which the disk image or disk images of the virtual machine is to be placed is also determined. If the pool includes only one storage system which is accessible to each physical computing system included in the pool, this storage system is selected. The storage system selected directly follows from the selected pool in this case. As such, selection of the storage system may be implicit based on the selected pool. In other cases, it may be necessary to expressly select a storage system. For example, a pool may include five physical computing systems, each of which can access both of two shared storage systems. After selecting this pool, it is necessary to select one of the two shared storage systems.

The disk image or disk images of the virtual machine may then be copied to the target storage system. Customization of the disk image or disk images may then be performed.

At the second phase 304, a target physical computing system at which the virtual machine is to execute is automatically determined. Specifically, the second phase 304 may select one of the physical computing systems included in the pool selected at the first phase 302. Diverse criteria may be considered in selecting a target physical computing system from the selected pool.

The virtual machine is then executed at the target physical computing system. It is noted that executing a virtual machine on a physical computing system is known in the art as placing the virtual machine on the physical machine. It is emphasized that this physical computing system is known to be able to access the disk image or disk images of the virtual machine.

It is emphasized that the first phase 302 impacts the amount of flexibility and maneuverability available in the second phase 304. The decisions which are possible in the second phase depend on the decision made during the first phase. This is because the selected pool influences the physical computing systems to which the virtual machine can be migrated in the future. Therefore, even though the two phases are separate and distinct, they are nonetheless inherently interrelated. The decision made during the first phase 302 is thus made independently of the second phase 304 but with an awareness of the restrictions which will be placed thereby on the second phase 304.

It is noted that the flexibility and maneuverability described above does not solely depend on the decision as to which storage system should host the disk images. Other factors, such as the network subnet via which the virtual machine communicates, also affect flexibility and maneuverability.

During a third phase 306, live migration of executing virtual machines is performed. It is emphasized that the third phase is an optional feature of the present invention.

It may periodically be advantageous to migrate an executing virtual machine away from its current physical computing system. Migrations may be performed in response to performance considerations. Specifically, a physical computing system may be overloaded in terms of one or more resources. For example, the virtual machines executing on a physical computing system at a given point in time may require more combined CPU power than is offered by the physical computing system. As another example, the virtual machines executing on a physical computing system at a given point in time may require more combined memory than is included in the physical computing system.

In such cases, it is advantageous to migrate one or more virtual machines from the overloaded physical computing system to an underutilized physical computing system. As a result, the originating physical computing system may have sufficient resources to execute the virtual machines remaining thereat. The destination physical computing system may have sufficient resources to execute both the migrated virtual machine or virtual machines and any virtual machines already executing thereat. It is emphasized that as a result, the load is balanced across the originating physical computing system and the destination physical computing system.

Moreover, if the migrations are performed as live migrations, load balancing is achieved without interrupting service to the virtual machines.

Migrations may also be performed for reasons other than performance considerations. For example, the physical computing system may need to undergo downtime due to maintenance. In such cases, all of the virtual machines may be migrated to other physical computing systems. Moreover, if the migrations are performed as live migrations, service to the virtual machines is not interrupted even though the physical computing system was stopped.

It is emphasized that the possible reasons for migrating a virtual machine are not limited to the foregoing reasons. Migrations may be performed for a wide variety of reasons.

The third phase 306 operates on virtual machines which have already been placed and are in a runtime phase. However, additional virtual machines can be added according to the first phase 302 and the second phase 304 simultaneously with the third phase operating on currently executing virtual machines.

The third phase 306 may comprise determining when executing virtual machines should be migrated to other physical computing systems. Virtual machines may be selected for migration for any of the reasons described above.

Accordingly, in an embodiment of the present invention, the second phase 304 is repeated in order to select a physical computing system to which the virtual machine should be migrated. The repeated second phase 304 selects a physical computing system from the pool originally selected during the first phase 302. Live migration is then performed to migrate the virtual machine to the physical computing system selected at the repeated second phase 304.

In an embodiment of the present invention, the third phase 306 includes predicting when and where migrations may be performed or may be required. Such predictions may identify the virtual machine to be migrated and the target physical computing system to which the virtual machine is migrated.

It is emphasized that the goal of the first phase 302 and the second phase 304 is to maximize the flexibility available at the third phase 306.

It is noted that migrating a virtual machine to a physical computing system in a different pool is disruptive. In particular, such migrations cannot be performed as live migrations. Migrating a virtual machine to a physical computing system within the same pool beneficially avoids these disruptions. As a corollary, it is important to choose the most optimal pool during the first phase 302. A suboptimal decision at the first phase increases the probability that the virtual machine must be migrated to a different pool (and thus without the benefit of live migration) at a later point in time.

Figure 4:
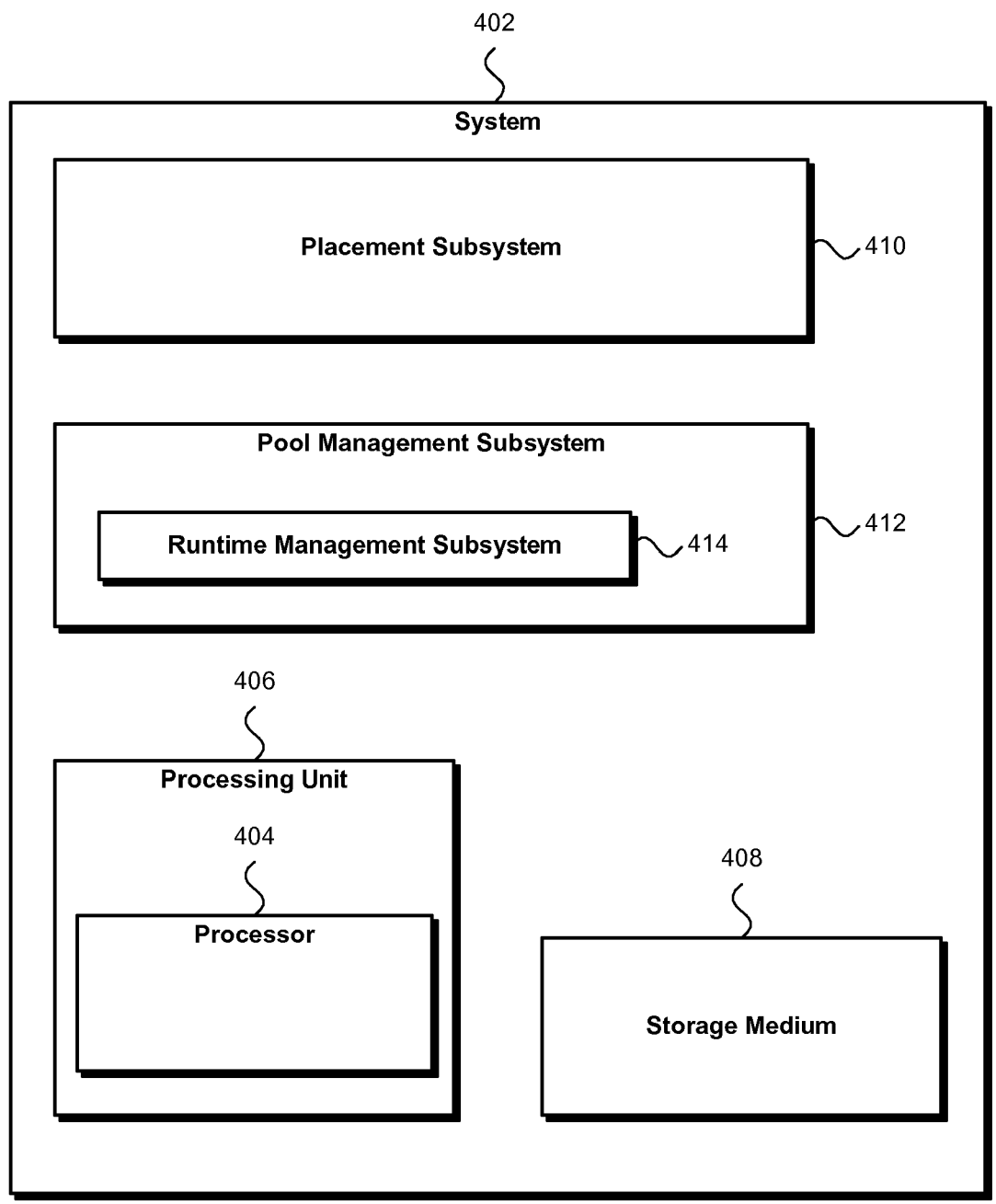
FIG. 4 illustrates an example system for placement of a virtual machine in a computing system.

Turning now to FIG. 4, an example system 402 for placement of a virtual machine in a computing system is illustrated.

The system 402 shown in FIG. 4 may exist within an environment such as the example environment shown in FIGS. 1-2. Alternatively or in addition, the system shown in FIG. 4 may operate on an environment such as the example environment shown in FIGS. 1-2. As described above, this environment may exist within a computer network.

The system 402 may include one or more processors 404. A processor may be a general purpose microprocessor. A processor may also be a specialized logic device.

The system 402 may further include a processing unit 406. The processing unit may include the processor or processors 404. The processing unit may be embedded in hardware, software or a combination thereof. The processing unit may achieve any of the operations performed thereby by causing instructions to be executed by one or more of the processors.

The system 402 may further comprise one or more storage media 408 configured to store data in a computer usable format. The storage medium may include one or more memories such as the memory shown in FIG. 2. Such a memory may have any of the properties described above in regard to FIG. 2. The storage medium may also include one or more storage systems such as the non-shared storage system shown in FIG. 2, the shared storage systems shown in FIG. 1, or both. Such shared storage systems and non-shared storage systems may have any of the properties described above in regard to FIGS. 1-2.

The system 402 further comprises a placement subsystem 410. The placement subsystem may be a management utility which selects the physical computing system at which a virtual machine is to be executed. It is noted that the placement subsystem may be referred to simply as the placement.

The placement subsystem 410 is configured to automatically determine a target storage system of a plurality of storage systems in a computer network to place at least one disk image of a virtual machine based, at least in part, on available storage capacities of the plurality of storage systems in the computer network. In an embodiment of the present invention, automatically determining the target storage system is based, at least in part, on connectivity between a plurality of computers in the computer network and the plurality of storage systems.

The placement subsystem 410 may be further configured to automatically determine a target computer in the computer network to install the virtual machine based, at least in part, on connectivity between the target computer and the target storage system.

It is noted that the tasks and roles implemented by the placement subsystem 410 may not be restricted to the initial placement decision. To the contrary, the placement subsystem may be configured to perform any of a variety of other tasks depending on the requirements of a given implementation.

The system 402 further comprises a pool management subsystem 412. The pool management subsystem is configured to send a first request to the placement subsystem 410. The first request includes specification of available storage capacities of the plurality of storage systems in the computer network. The first request may further include specification of a required storage space of the virtual machine. The pool management subsystem is further configured to receive an identification of the target storage system from the placement subsystem. The pool management subsystem is further configured to write the at least one disk image of the virtual machine to the target storage system.

In an embodiment of the present invention, the pool management subsystem 412 is further configured to send a second request to the placement subsystem 410. The pool management subsystem is further configured to receive an identification of the target computer from the placement subsystem. The pool management subsystem 412 is further configured to install the virtual machine at the target computer. As a result, the virtual machine may be an isolated operating system instance executing on the target computer. The virtual machine may instead be an isolated space of an operating system executing on the target computer.

The pool management subsystem 412 may additionally be responsible for understanding and storing information about the details of the environment. Thus, the pool management subsystem may maintain a mapping of the physical properties of the environment. The pool management subsystem may be configured to include this information, may be configured to obtain this information, or a combination thereof.

The details about the environment may include information about the shared storage systems existing in the environment. The details may further include which physical computing systems and other hardware devices are connected to, and thus able to access, which storage systems.

The details about the environment may also include information about the computer networks and network subnets existing in the environment. The details may further include which physical computing systems and other hardware devices are connected to which network subnets. The details may further include how many IP addresses exist and which IP addresses are available on each network segment. It is emphasized that the details are not limited to those listed here.

The system 402 may further comprise a runtime management subsystem 414. The runtime management subsystem implements the third phase shown in FIG. 3. Specifically, the runtime management subsystem may perform any of the operations described above as being included in the third phase shown in FIG. 3. The runtime management subsystem may also perform any other tasks which must be performed subsequently to the initial placement decision.

The runtime management subsystem 414 is configured to select a new computer in the computer network for installing the virtual machine. The runtime management system is further configured to perform a live migration of the virtual machine to the new computer in the computer network.

In an embodiment of the present invention, the runtime management subsystem 414 is incorporated into the placement subsystem 410. The placement subsystem therefore performs the operations ascribed to the runtime management subsystem. It is noted that in this case, the placement subsystem is responsible for runtime management of the virtual machines executing in the environment.

In another embodiment of the present invention, the runtime management subsystem 414 is separate from the placement subsystem 410. Nonetheless, the runtime management subsystem 414 is included in the same computer program product which implements the initial placement decision.

In another embodiment of the present invention, the runtime management subsystem 414 is completely distinct from the computer program product which implements the initial placement decision. In this case, after the initial placement decision, control may be ceded to the runtime management subsystem.

It is emphasized that the system 402 may include subsystems other than those described above. Any such additional subsystems may also participate in the process of placement of virtual machines.

The placement subsystem 410, the pool management subsystem 412 and the runtime management subsystem 414 may be implemented in hardware, software or a combination thereof. Any or all of these subsystems may be a computer or may be comprised by a computer. Any or all of these subsystems may achieve any of the operations performed thereby by causing instructions to be executed by a processing unit such as the processing unit 406 comprised by the system 402, a processor 404 such as the processor included in the system and comprised by the processing unit, or both. Moreover, any or all of the subsystems may, in performing any of the operations performed thereby, read data from, and write data to, a storage medium such as any or all of the storage media 408 comprised by the system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5A:
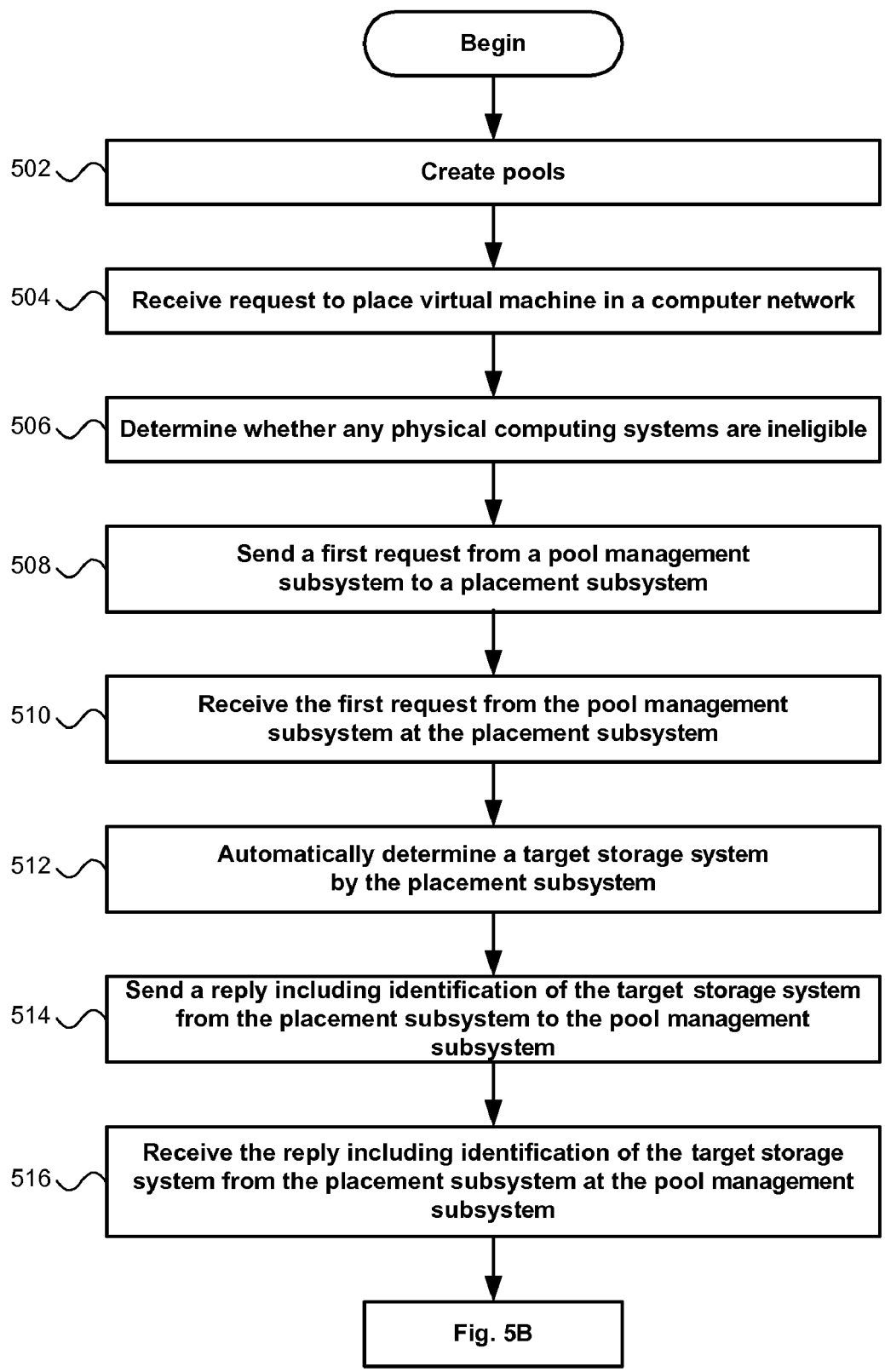
FIGS. 5A-5C demonstrate an example sequence of operations for placement of a virtual machine in a computing system.
Figure 5B:
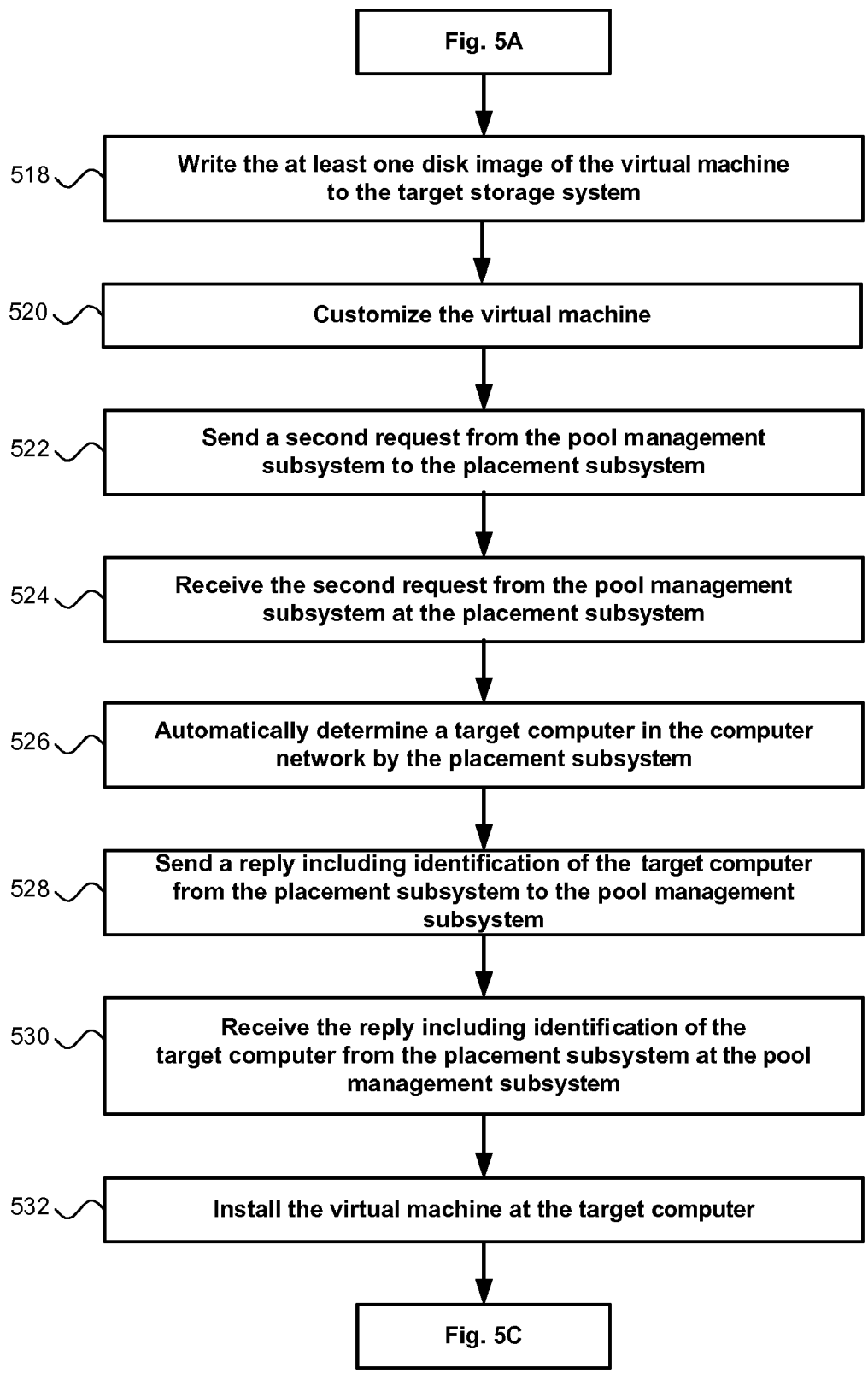
Figure 5C:
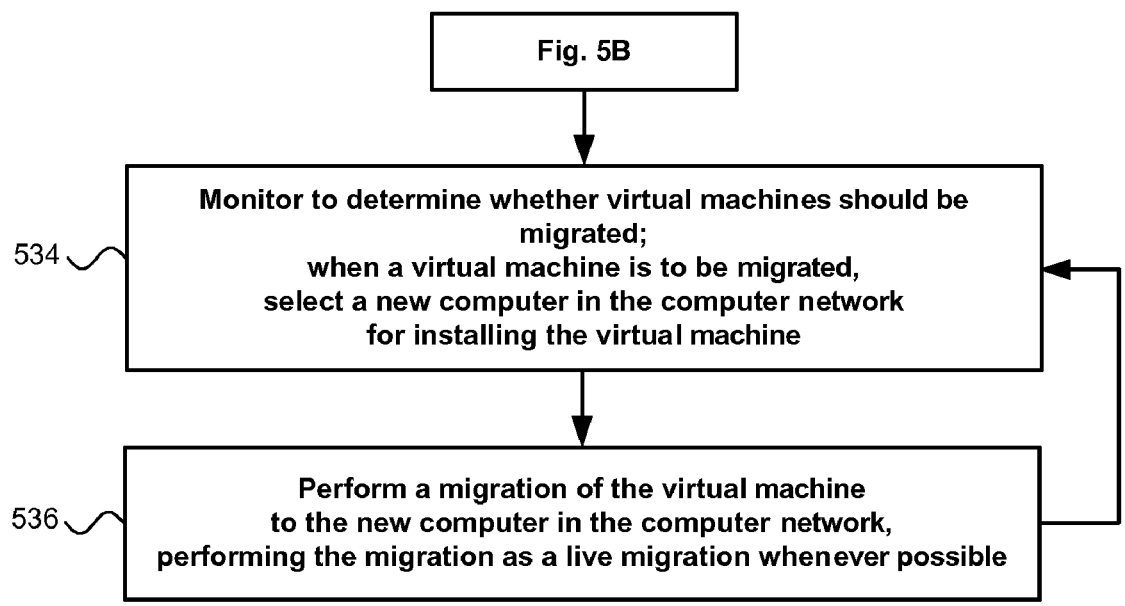

Turning now to FIGS. 5A-5C, an example sequence of operations for placement of a virtual machine in a computing system is demonstrated.

The operations shown in FIGS. 5A-5C may be performed by a system such as the example system shown in FIG. 4. The system may include the placement subsystem and the pool management subsystem shown in FIG. 4. The system may also include the runtime management subsystem shown in FIG. 4.

Figure 6:
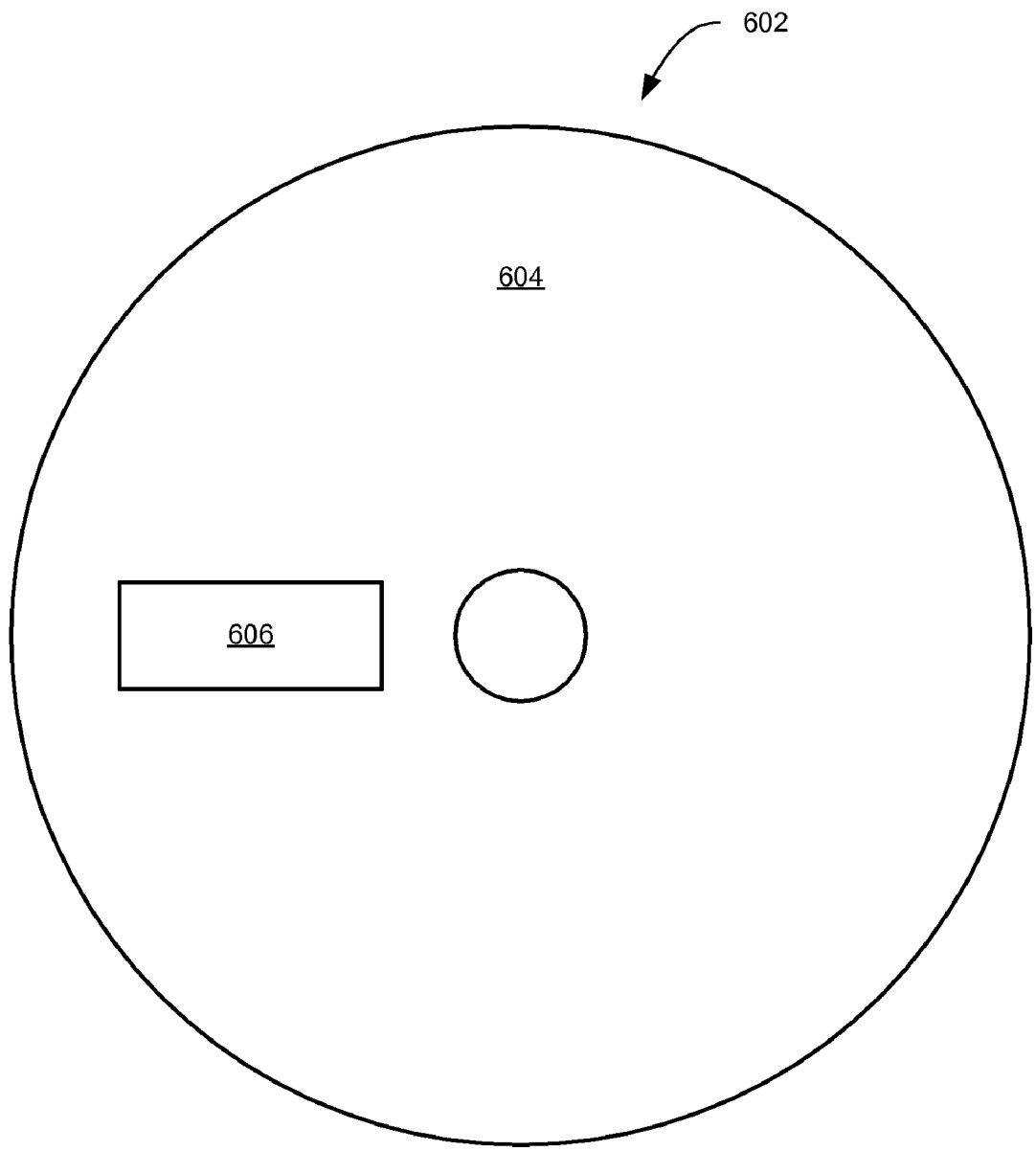
FIG. 6 depicts one embodiment of an article of manufacture incorporating one or more aspects of the invention.

Any or all of the example operations shown in FIGS. 5A-5C may be performed automatically. Moreover, any or all of the example operations shown in FIG. 5 may be performed by causing instructions to be executed by a processing unit such as the processing unit comprised by the example system shown in FIG. 4, a processor such as the processor included in this system and comprised by the processing unit, or both. Moreover, any or all of the operations may read data from, and write data to, storage media such as any or all of the storage media comprised by this system. Furthermore, the operations shown in FIGS. 5A-5C may be performed by a computer program product as shown in FIG. 6 and described below.

The operations shown in FIGS. 5A-5C may be performed within an environment such as the example environment shown in FIGS. 1-2. Alternatively or in addition, the operations shown in FIGS. 5A-5C may operate on an environment such as the example environment shown in FIGS. 1-2. As described above, this environment may exist within a computer network.

At pool creating operation 502 in FIG. 5A, pools are created based on the actual hardware existing in the environment. Pool creating operation 502 may be performed by the pool management subsystem.

Pool creating operation 502 may be performed according to any of the techniques and embodiments for creating pools described above in regard to FIG. 3.

In an embodiment of the present invention, pool creating operation 502 creates pools such that migration of a virtual machine from any physical computing system included in the pool to any other physical computing system included in the same pool can be performed as a live migration.

In another embodiment of the present invention, pool creating operation 502 creates one pool for each shared storage system. Each such pool includes each physical computing system which can access the shared storage system. The shared storage system may itself be included in the pool.

In a further embodiment of the present invention, an additional pool is created for any physical computing system which is not connected to a shared storage system. Such pools may be thought of as imaginary storage systems to which the physical computing systems are connected. For example, in the environment shown in FIG. 1, physical computing systems "09" and "10" would each be placed alone in two new pools. It is noted that these "imaginary" storage systems beneficially permit later interactions to be unaware of the distinction between physical computing systems which are connected to shared storage systems and those which are not connected thereto.

After pool generation operation 502 is completed, control passes to receiving operation 504.

At receiving operation 504, a request to place a virtual machine in a computer network is received at the pool management subsystem. The request may have been initiated by a human user. The request may instead have been initiated by an automated process implemented in software, hardware or a combination thereof. After pool receiving operation 504 is completed, control passes to determining operation 506.

At determining operation 506, it is determined whether any physical computing systems are ineligible to execute the virtual machine. Determining operation 506 may be performed by the pool management subsystem.

It may be determined which physical machines are capable of executing the virtual machine at a coarse level. For example, one or more physical computing systems may have an architecture which cannot execute the virtual machine. Any physical computing system which is incapable of executing the virtual machine is deemed ineligible.

Additionally, a virtual machine typically requires one or more IP addresses. It may be determined whether any network subnet does not have sufficient IP addresses available to execute the virtual machine. For any network subnet for which this is the case, any physical computing system connected to that subnet is deemed ineligible.

After determining operation 506 is completed, control passes to sending operation 508.

At sending operation 508, the pool management subsystem sends a first request to the placement subsystem. The first request is a request for the identity of the pool in which the disk image or disk images of the virtual machine should be placed.

The first request includes information about the pools existing in the environment or computer network. The first request may include specification of the pools. More specifically, the first request may include specification of which physical computing systems are included in each pool. Alternatively or additionally, the first request may include specification of which physical computing systems are connected to which storage systems.

The first request may also include specification of available storage capacities of one or more storage systems in the computer network. In an embodiment of the present invention, the first request further includes specification of a required storage space of the virtual machine. Specifically, the first request may include specification of a required storage space for the disk image or the disk images of the virtual machine.

In an embodiment of the present invention, the first request is transmitted by invoking a function named "imagePlacement". This function has two parameters. The first parameter, named "desc", includes a description of the virtual machine. The second parameter, named "PoolInfo", includes information about the pools.

After sending operation 508 is completed, control passes to receiving operation 510.

At receiving operation 510, the placement subsystem receives the first request. After receiving operation 510 is completed, control passes to determining operation 512.

At determining operation 512, the placement subsystem automatically determines a target storage system at which to place at least one disk image of the virtual machine. The target storage system is selected from the one or more storage systems included in the computer network as specified by the first request. Determining operation 512 thus performs the first phase of the calculations for a two-phase placement decision as shown in FIG. 3.

Determining operation 512 may be performed according to any of the techniques for selecting pools and storage systems described above in regard to the first phase of FIG. 3. It is emphasized that as a result, automatically determining the target storage system may be based, at least in part, on connectivity between a plurality of computers in the computer network and the plurality of storage systems included therein.

As described above, determining operation 512 may select a pool. The target storage system may depend on the selected pool. A wide variety of techniques and algorithms may be employed to select a target storage system, a pool or both.

In determining the target storage system, determining operation 512 may consider as input the information specified by the first request. Determining operation 512 may additionally consider any other information observed by the placement subsystem about the environment or computer network.

Determining operation 512 may select a target storage system based, at least in part, on the available storage capacities of the one or more storage systems in the computer network as specified by the first request. Clearly, it is not possible to place a disk image on a storage system with no free space. Moreover, as noted above, the first request may include specification of a required storage space of the virtual machine. Thus, the target storage system may be selected to ensure that at least the specified amount of storage space is available thereat. It is thereby ensured that the target storage system has sufficient storage space to store the disk image or disk images of the virtual machine.

It is noted that if the disk image or disk images of the virtual machine are placed on a non-shared storage system, live migration of the virtual machine cannot be performed. This is because no other physical computing system can access the non-shared storage system. Thus, selecting a storage system having sufficient free space beneficially ensures that the disk image or disk images can be written at a shared storage system. This, in turn, beneficially enables live migration.

In an embodiment of the present invention, determining operation 512 considers any or all of the resources and/or requirements which will be considered in selecting a physical computing system during the second phase of the placement decision. Thus, the decision as to the target storage system is not restricted to considering only storage requirements. A virtual machine may have requirements, other than storage requirements, which must be fulfilled for the virtual machine to execute. It may be the case that all of the physical computing systems which can access a given storage system are unable to fulfill these requirements. This embodiment thus beneficially ensures that a decision as to the storage system is not made in the first phase which prevents any decision from being made in the second phase.

In an embodiment of the present invention, all of the pools in the environment are initially considered. Any pool is discarded if the shared storage system associated therewith does not have sufficient available storage capacity to store the disk image or disk images of the virtual machine. It is then determined which of the remaining pools includes the highest number of physical computing systems. If at least one physical computing system included in this pool has sufficient resources to execute the virtual machine, this pool is selected. Otherwise, pools may be considered in descending order of the number of physical computing systems included therein until the preceding criterion is met. This algorithm advantageously ensures future flexibility, as the resulting placement decision maximizes the number of physical computing systems to which the virtual machine can be migrated via live migration.

In another embodiment of the present invention, the foregoing algorithm is modified so that the pool having the highest number of physical computing systems which are capable of hosting the virtual machine (as opposed to the highest raw number of physical computing systems) is selected. This algorithm advantageously ensures even greater flexibility in future live migration. However, a tradeoff is that additional verification is required during the initial placement decision.

In another embodiment of the present invention, all of the pools in the environment are initially considered. It is determined which of the pools includes the greatest amount of available storage capacity. If at least one physical computing system included in this pool has sufficient resources to execute the virtual machine, this pool is selected. Otherwise, pools may be considered in descending order of the amount of available storage capacity included therein until the preceding criterion is met. This algorithm advantageously balances storage consumption across the shared storage systems included in the environment.

In another embodiment of the present invention, all of the pools in the environment are initially considered. Any pool is discarded if the number of physical computing systems included therein which are sufficiently connected and which have sufficient resources to execute the virtual machine is less than a predefined threshold. Out of the remaining pools, the pool having the greatest amount of available storage capacity is selected.

Additionally, aspects of the foregoing embodiments may be combined.

It is emphasized that the selection of the pool and/or the storage system at determining operation 512 influences the degrees of freedom subsequently available to the placement subsystem in initially selecting a physical computing system and in migrating executing virtual machines.

After determining operation 512 is completed, control passes to sending operation 514.

At sending operation 514, a reply to the first request is sent from the placement subsystem to the pool management subsystem. The reply includes an identification of the target storage system selected at determining operation 512. Thus, the reply may be construed as specifying that the disk image or disk images of the virtual machine should be placed at the target storage system identified by the reply. The reply may also include an identification of a pool selected at determining operation 512. After sending operation 514 is completed, control passes to receiving operation 516.

At receiving operation 516, the reply sent at sending operation 514 is received at the pool management subsystem. Because the reply includes the identification of the target storage system, the identification of the target storage system is received at the pool management subsystem. After receiving operation 516 is completed, control passes to writing operation 518.

Turning now to FIG. 5B, at writing operation 518, the at least one disk image of the virtual machine is written to the target storage system identified by the reply received at receiving operation 516. Writing operation 518 may comprise copying the at least one disk image from a previous location to the target storage system.

As previously noted, the disk image or disk images may be very large. Thus, a significant amount of time may be required to copy the disk image or disk images.

In an embodiment of the present invention, writing operation 518 is performed by the pool management subsystem. In another embodiment of the present invention, writing operation 518 is performed by the placement subsystem. In another embodiment of the present invention, writing operation 518 is performed by a subsystem other than the aforementioned subsystems.

After writing operation 518 is completed, control passes to customizing operation 520.

At customizing operation 520, after the at least one disk image is completely copied, initial customization of the virtual machine may be performed. This customization may be required by the virtual machine, another system included in the environment, or both. The customization may be achieved by modifying one or more disk images. The customizations needed may vary depending on the placement decision. For example, a disk image may be customized to include the IP address or addresses which are assigned to the virtual machine. As with the preceding operation, the time required to perform any customizations may be significant.

In an embodiment of the present invention, customizing operation 520 is performed by the pool management subsystem. In another embodiment of the present invention, customizing operation 520 is performed by the placement subsystem. In another embodiment of the present invention, customizing operation 520 is performed by a subsystem other than the aforementioned subsystems.

After customizing operation 520 is completed, control passes to sending operation 522.

At sending operation 522, after the disk image or disk images are ready for execution of the virtual machine, the pool management subsystem sends a second request to the placement subsystem. The second request is a request for the identity of the physical computing system at which the virtual machine should execute. The request may indicate that the physical computing system should be selected from those physical computing systems which can access the storage system at which the disk image or disk images of the virtual machine were written. The request may also indicate that the physical computing system should be selected from those physical computing systems which are connected to a network subnet having sufficient IP addresses to execute the virtual machine.

In an embodiment of the present invention, the second request is transmitted by invoking a function named "vmPlacement". This function has one parameter. This parameter, named "desc", includes a description of the virtual machine.

After sending operation 522 is completed, control passes to receiving operation 524.

At receiving operation 524, the placement subsystem receives the second request. After receiving operation 524 is completed, control passes to determining operation 526.

At determining operation 526, the placement subsystem automatically determines a target computer in the computer network to install the virtual machine. Determining operation 526 thus performs the second phase of the calculations for a two-phase placement decision as shown in FIG. 3.

The target physical computing system may be selected from the physical computing systems known to be able to access the target storage system selected at determining operation 512. The target physical computing system may, instead or additionally, be selected from a pool selected at determining operation 512. As previously discussed, the pools may be created so that all physical computing systems included in a pool can access a common storage system. Therefore, the target computer is selected based, at least in part, on connectivity between the target computer and the target storage system.

In addition to the foregoing, diverse criteria may be considered in selecting a specific physical computing system. "Hard" criteria may be considered. Specifically, the physical computing systems included in a pool may not be identical in architecture. For example, the physical computing systems included in a pool may be based on different processors. Therefore, determining operation 526 may select a physical computing system having an architecture which is compatible with the virtual machine. For example, if the virtual machine requires a specific processor, determining operation 526 may select a physical computing system based on that processor.

The physical computing systems in a pool may also be unequal in terms of hardware capabilities. Determining operation 526 may also select a physical computing system having sufficient hardware capabilities to execute the virtual machine. Specifically, determining operation 526 may select a physical computing system having sufficient random access memory (RAM) to execute the virtual machine. Determining operation 526 may also select a physical computing system having sufficient processing (CPU) power to accommodate the expected CPU consumption of the virtual machine. Determining operation 526 may also select a physical computing system having access to a subnet having a specified minimum number of IP addresses available for use.

"Soft" criteria may also be considered. Specifically, a virtual machine may not execute equally efficiently on all of the physical computing systems included in the pool. Therefore, determining operation 526 may select a physical computing system on which the virtual machine will execute with an efficiency which is relatively high compared to other possible selections.

Criteria related to configuration may also be considered. For example, a requirement may exist that two different virtual machines may not execute at the same physical computing system. Such a requirement is known in the art as anti-colocation. Determining operation 526 may select a target physical computing system which does not contradict this requirement.

In an embodiment of the present invention, determining operation 526 initially considers all physical computing systems included in the pool selected at determining operation 512. Any physical computing system which is incapable of executing the virtual machine is discarded. Out of the remaining physical computing systems, the physical computing system having the greatest amount of available memory is selected. This algorithm advantageously balances memory consumption across the available physical computing systems.

In another embodiment of the present invention, the foregoing algorithm is modified so that the physical computing system having the fewest virtual machines already executing thereat (as opposed to the greatest amount of available memory) is selected. This algorithm advantageously reduces resource conflicts.

In an embodiment of the present invention, resource utilization of the virtual machine, expected resource utilization of the virtual machine, or both are input to the placement decision. The resources considered may include without limitation memory and CPU usage. These factors may be input at determining operation 512, determining operation 526, or both. Considering these factors may advantageously ensure that the virtual machine can remain at the selected physical computing system in the long term. Thus, the quality of the placement decision is improved.

Additionally, aspects of the foregoing embodiments may be combined.

In an embodiment of the present invention, the calculations performed at determining operation 526 (e.g., the second phase) are different from the calculations performed at determining operation 512 (e.g., the first phase). At the first phase, it may be necessary to consider all physical computing systems present in the environment. However, after the first phase, any physical computing system not included in the selected pool is known to be ineligible to host the virtual machine. Eligibility may be based on accessibility to the storage system hosting the disk images, location on the same network subnet, and any other resource considerations as described above. Therefore, at the second phase, it is only necessary to consider the physical computing systems included in the selected pool.

Accordingly, at determining operation 526, the calculations can be restricted to the physical computing systems of the pool previously selected. The calculations can also be restricted to the physical computing systems which can access the storage system at which the disk image or disk images of the virtual machine were written.

In another embodiment of the present invention, the calculations performed at determining operation 526 (e.g., the second phase) are identical to the calculations performed at determining operation 512 (e.g., the first phase).

In an embodiment of the present invention, determining operation 512 (e.g., the first phase) has access to relatively long-term predictions of the behavior and resource requirements of the virtual machine. Determining operation 512 thus considers this information in selecting a pool, storage system, or both. By contrast, determining operation 526 (e.g., the second phase) has access to relatively short-term estimates of resource demands. The estimates may relate only to the present and the immediate future. As a result, the placement subsystem may select a storage location for the disk image or disk images of the virtual machine which will meet the requirements of the virtual machine for the entire runtime thereof. By contrast, the physical computing system at which the virtual machine executes can be changed in the future via live migration and therefore without disruption of the virtual machine.

After determining operation 526 is completed, control passes to sending operation 528.

At sending operation 528, a reply to the second request is sent from the placement subsystem to the pool management subsystem. The reply includes an identification of the target computer selected at determining operation 526. Thus, the reply may be construed as specifying that the virtual machine should be started at the target computer identified by the reply. The reply may additionally include any other information derived by the placement subsystem which is necessary in order to start the virtual machine. After sending operation 528 is completed, control passes to receiving operation 530.

At receiving operation 530, the reply sent at sending operation 528 is received at the pool management subsystem. Because the reply includes the identification of the target computer, the identification of the target computer is received at the pool management subsystem. After receiving operation 530 is completed, control passes to installing operation 532.

At installing operation 532, the virtual machine is installed at the target computer identified by the reply received at receiving operation 530. Thus, the virtual machine may begin executing at the target computer.

As a result of installing operation 532, the virtual machine may be an isolated operating system instance executing on the target computer. The virtual machine may instead be an isolated space of an operating system executing on the target computer.

In an embodiment of the present invention, installing operation 532 is performed by the pool management subsystem. In another embodiment of the present invention, installing operation 532 is performed by the placement subsystem. In another embodiment of the present invention, installing operation 532 is performed by a subsystem other than the aforementioned subsystems.

After installing operation 532 is completed, control passes to monitoring operation 534.

At monitoring operation 534, the environment is monitored to determine whether any of the virtual machines executing therein should be migrated to a different physical computing system. It is emphasized that a virtual machine thus selected may have been initially placed according to the foregoing operations.

Turning now to FIG. 5C, an embodiment of the present invention, monitoring operation 534 is performed by the runtime management subsystem. In another embodiment of the present invention, monitoring operation 534 is performed by the placement subsystem. In another embodiment of the present invention, monitoring operation 534 is performed by a subsystem other than the aforementioned subsystems.

Monitoring operation 534 may determine that one or more virtual machines should be migrated according to any of the considerations described above in regard to the third phase shown in FIG. 3. The factors considered to determine which virtual machines are to be migrated, which physical computing systems these virtual machines are to be migrated to, and the rationale for any migrations may be identical to the factors considered in the initial placement decision.

When it is determined that a virtual machine should be migrated, monitoring operation 534 further selects a new computer in the computer network for installing the virtual machine. It is noted that selecting virtual machines to be migrated and selecting physical computing systems for installing the migrated virtual machine may or may not be performed as distinct operations.

In an embodiment of the present invention, monitoring operation 534 causes determining operation 526 (e.g., the second phase of the calculation) to be repeated in order to select a physical computing system to which the virtual machine should be migrated. The repeated determining operation 526 selects a physical computing system from the pool originally selected at determining operation 512 (e.g., the first phase of the calculation.)

It is emphasized that both the physical computing system selected during the original second phase and the physical computing system selected during the repeated second phase are included in the same pool. If it is known to be possible to migrate a virtual machine between any two physical computing systems included in the same pool, then the live migration can simply be performed. Otherwise, it may be necessary to verify that live migration to the selected physical computing system is possible. If live migration is not possible, a different physical computing system may be selected. This may be achieved by, for example, repeating determining operation 526 again.

Monitoring operation 534 may periodically optimize the placement of any or all of the virtual machines throughout the environment. To achieve this goal, monitoring operation 534 may analyze the environment. Based on this analysis, monitoring operation 534 may determine that a migration of a virtual machine to a different physical computing system would improve the optimality of the environment.

Monitoring operation 534 may consider each pool separately. Thus, the second phase of the calculations may be executed on each pool separately. This is possible because each physical computing system is included in exactly one pool. More specifically, for each pool, calculations identical or similar to the calculations performed at determining operation 526 may be applied to each pool to determine an optimal placement of the virtual machines within the physical computing systems included in the pool. Considering each pool separately advantageously simplifies the optimization problem.

However, it is possible that migrations within the same pool are insufficient to solve problems and reduce inefficiencies within the environment. This is possible even if the pool selection at the first phase was optimal. In this case, the environment may be considered as a whole again, as opposed to considering each pool individually. Both phases of the two-phase algorithm described above may then be solved again for any or all of the virtual machines executing in the environment. As a result, one or more virtual machines may be selected for migration. In this case, the migrations thus performed may move a virtual machine from one pool to another pool and therefore are not guaranteed to be live migrations.

Additionally, in many real-world environments, other factors may render it impracticable or impossible to consider the pools separately as described above. For example, the performance of a virtual machine executing on a physical computing system in one pool may be dependent on the performance of a virtual machine executing on a different physical computing system in a different pool. The possible factors which may contradict considering the pools separately are not limited to this factor.

When monitoring operation 534 determines that a virtual machine should be migrated to a selected new physical computing system, control passes to migrating operation 536.

At migrating operation 536, the virtual machine selected at monitoring operation 534 is migrated to the physical computing system selected at monitoring operation 534.

In an embodiment of the present invention, migrating operation 536 is performed by the runtime management subsystem. In another embodiment of the present invention, migrating operation 536 is performed by the placement subsystem. In another embodiment of the present invention, migrating operation 536 is performed by a subsystem other than the aforementioned subsystems.

The migration may be performed as a live migration whenever possible. In this case, a live migration of the selected virtual machine to the selected new computer in the computer network is performed. Otherwise, the migration may require stopping the virtual machine.

After migrating operation 536 is completed, control passes to monitoring operation 534. Thus, monitoring operation 534 may be an ongoing process which continues to execute even as individual virtual machines are added to the environment and removed from the environment.

In an embodiment of the present invention, multiple interdependent virtual machines are simultaneously placed according to the example operations shown in FIGS. 5A-5C. For example, a distributed system may be implemented as a group of virtual machines. Some of the virtual machines may be nodes executing the IBM WebSphere® Application Server. Other virtual machines may be nodes executing the IBM DB2® database. The remaining virtual machines may be yet other types of nodes. WebSphere and DB2 are registered trademarks of International Business Machines Corporation, Armonk, N.Y., United States, in the United States, other countries, or both.

In a further embodiment of the present invention, restrictions may be specified that the disk image or disk images for any or all of the virtual machines placed simultaneously must be written at the same storage system. Determining operation 512 may enforce these restrictions.

It is emphasized that dividing the placement decision into two separate phases enables deciding where the disk image of the virtual machine should be placed prior to selecting the target physical computing system at which the virtual machine should execute. For the reasons described above, the amount of time required to store the disk image at the target storage system and customize the disk image may be significant. It is possible for the optimal physical computing system within the selected pool to change during this time interval. Therefore, dividing the placement decision into two separate phases advantageously allows the placement decision to take into account any changes occurring during this time interval.

Moreover, placement decisions are potentially computationally expensive. By dividing the necessary calculations to make a placement decision into two phases, redundant calculations are reduced. Therefore, the efficiency of placement decisions is advantageously increased.

Another aspect of the invention is directed to embodiments that can be embodied in the form of computer-implemented processes and apparatuses for practicing those processes, which is now described with reference to FIG. 6. For example, the computer implemented operations for placement of a virtual machine in a computing system are embodied in computer program code executed by computer processors.

Embodiments include a computer program product 602 as depicted in FIG. 6 on a computer usable medium 604 with computer program code logic 606 containing instructions embodied in tangible media as an article of manufacture. Exemplary articles of manufacture for computer usable medium 604 may include floppy diskettes, CD-ROMs, hard drives, universal serial bus (USB) flash drives, or any other computer-readable storage medium, wherein, when the computer program code logic 606 is loaded into and executed by a computer, the computer becomes an apparatus for practicing the invention.

Embodiments include computer program code logic 606, for example, whether stored in a storage medium, loaded into and/or executed by a computer, wherein, when the computer program code logic 606 is loaded into and executed by a computer, the computer becomes an apparatus for practicing the invention. When implemented on a general-purpose microprocessor, the computer program codes configure the microprocessor to create specific logic circuits.

Additionally, at least one program storage device readable by a machine, tangibly embodying at least one program of instructions executable by the machine to perform the capabilities of the system can be provided. The article of manufacture can be included as a part of a computer system or sold separately.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for placement of a virtual machine in a computing system, the method comprising:
   sending, from a pool management subsystem, a first request to a placement subsystem, the first request including specification of available storage capacities of a plurality of storage systems in a computer network;
   automatically determining, by the placement subsystem, a target storage system of the plurality of storage systems to place at least one disk image of the virtual machine based, at least in part, on the available storage capacities of the plurality of storage systems in the computer network;
   receiving, at the pool management subsystem, an identification of the target storage system from the placement subsystem;
   writing the at least one disk image of the virtual machine to the target storage system;
   sending, from the pool management subsystem, a second request to the placement subsystem;
   automatically determining, by the placement subsystem, a target computer in the computer network to install the virtual machine based, at least in part, on connectivity between the target computer and the target storage system;
   receiving, at the pool management subsystem, an identification of the target computer from the placement subsystem; and
   installing the virtual machine at the target computer.

2. The method of claim 1, wherein automatically determining the target storage system is based, at least in part, on connectivity between a plurality of computers in the computer network and the plurality of storage systems.

3. The method of claim 1, wherein the first request further includes specification of a required storage space of the virtual machine.

4. The method of claim 1, wherein the virtual machine is an isolated operating system instance executing on the target computer.

5. The method of claim 1, wherein the virtual machine is an isolated space of an operating system executing on the target computer.

6. The method of claim 1, further comprising:
selecting a new computer in the computer network for installing the virtual machine; and
performing a live migration of the virtual machine to the new computer in the computer network.

7. A system for placement of a virtual machine in a computing system, the system comprising:
a placement subsystem configured to automatically determine a target storage system of a plurality of storage systems in a computer network to place at least one disk image of the virtual machine based, at least in part, on available storage capacities of the plurality of storage systems in the computer network;
a pool management subsystem configured to send a first request to the placement subsystem, the first request including specification of the available storage capacities of the plurality of storage systems, to receive an identification of the target storage system from the placement subsystem, and to write the at least one disk image of the virtual machine to the target storage system;
the placement subsystem is further configured to automatically determine a target computer in the computer network to install the virtual machine based, at least in part, on connectivity between the target computer and the target storage system; and
the pool management subsystem is further configured to send a second request to the placement subsystem, to receive an identification of the target computer from the placement subsystem and to install the virtual machine at the target computer.

8. The system of claim 7, wherein automatically determining the target storage system is based, at least in part, on connectivity between a plurality of computers in the computer network and the plurality of storage systems.

9. The system of claim 7, wherein the first request further includes specification of a required storage space of the virtual machine.

10. The system of claim 8, wherein the virtual machine is an isolated operating system instance executing on the target computer.

11. The system of claim 8, wherein the virtual machine is an isolated space of an operating system executing on the target computer.

12. The system of claim 7, wherein the placement subsystem is further configured to:
select a new computer in the computer network for installing the virtual machine; and
perform a live migration of the virtual machine to the new computer in the computer network.

13. A computer program product embodied in a computer readable storage medium comprising:
computer readable program codes coupled to the computer readable storage medium, the computer readable program codes configured to cause the program to:
send, from a pool management subsystem, a first request to a placement subsystem, the first request including specification of available storage capacities of a plurality of storage systems in a computer network;
automatically determine, by the placement subsystem, a target storage system of the plurality of storage systems to place at least one disk image of the virtual machine based, at least in part, on the available storage capacities of the plurality of storage systems in the computer network;
receive, at the pool management subsystem, an identification of the target storage system from the placement subsystem;
write the at least one disk image of the virtual machine to the target storage system;
further comprising program code configured to:
send, from the pool management subsystem, a second request to the placement subsystem;
automatically determine, by the placement subsystem, a target computer in the computer network to install the virtual machine based, at least in part, on connectivity between the target computer and the target storage system;
receive, at the pool management subsystem, an identification of the target computer from the placement subsystem; and
install the virtual machine at the target computer.

14. The computer program product of claim 13, wherein automatically determining the target storage system is based, at least in part, on connectivity between a plurality of computers in the computer network and the plurality of storage systems.

15. The computer program product of claim 13, wherein the first request further includes specification of a required storage space of the virtual machine.

16. The computer program product of claim 15, wherein the virtual machine is an isolated operating system instance executing on the target computer.

17. The computer program product of claim 15, wherein the virtual machine is an isolated space of an operating system executing on the target computer.

18. The computer program product of claim 13, further comprising program code configured to:
select a new computer in the computer network for installing the virtual machine; and
perform a live migration of the virtual machine to the new computer in the computer network.

* * * * *